US009644988B2

(12) United States Patent
Aist et al.

(10) Patent No.: US 9,644,988 B2
(45) Date of Patent: May 9, 2017

(54) NAVIGATION SYSTEM WITH DATA GATHERING MECHANISM AND METHOD OF OPERATION THEREOF

(71) Applicant: Telenav, Inc., Sunnyvale, CA (US)

(72) Inventors: Gregory Stewart Aist, San Mateo, CA (US); Jose Sebastian, Mountain View, CA (US); Aliasgar Mumtaz Husain, Milpitas, CA (US); Casey Carter, Sunnyvale, CA (US)

(73) Assignee: Telenav, Inc., Santa Clara, CA (US)

( * ) Notice: Subject to any disclaimer, the term of this patent is extended or adjusted under 35 U.S.C. 154(b) by 23 days.

(21) Appl. No.: 14/160,186

(22) Filed: Jan. 21, 2014

(65) Prior Publication Data

US 2015/0204679 A1    Jul. 23, 2015

(51) Int. Cl.
*G01C 21/00* (2006.01)
*G01C 21/36* (2006.01)

(52) U.S. Cl.
CPC ..... *G01C 21/3682* (2013.01); *G01C 21/3644* (2013.01)

(58) Field of Classification Search
CPC ........ G01C 21/26; G01C 21/36; G01C 21/00; G01C 21/3611; G08G 1/096827
USPC ........................................................ 701/400
See application file for complete search history.

(56) References Cited

U.S. PATENT DOCUMENTS

| 6,728,635 B2* | 4/2004 | Hamada et al. ............... 701/431 |
| 8,370,060 B2* | 2/2013 | Rossio ............... G01C 21/3644 340/988 |
| 8,374,791 B2 | 2/2013 | Holsinger |
| 2011/0082668 A1* | 4/2011 | Escrig et al. ..................... 703/1 |

FOREIGN PATENT DOCUMENTS

WO    2010081549 A1    7/2010

OTHER PUBLICATIONS

Hile et al., Landmark-Based Pedestrian Naviation with Enhanced Spatial Reasoning, pp. 1-18. 2009.*
Furchgott, Navigating With Devices That Know Landmarks, The New York Times, Feb. 15, 2013, The New York Times Company, http://www.nytimes.com/2013/02/17/automobiles/navigating-with-devices-that-know-landmarks.html?_r=3&.
Garmin Nuvi, http://sites.garmin.com/nuvi/.
Hile et al., Landmark-Based Pedestrian Navigation with Enhanced Spatial Reasoning, pp. 1-18.

* cited by examiner

*Primary Examiner* — Maceeh Anwari
(74) *Attorney, Agent, or Firm* — IP Investment Law Group

(57) ABSTRACT

A method of operation of a navigation system includes: determining a travel context based on a travel condition; determining a source type with a control unit based on the travel context for providing a candidacy factor; and determining a candidate landmark based on the candidacy factor from the source type suited for the travel context.

20 Claims, 8 Drawing Sheets

NAVIGATION SYSTEM WITH DATA GATHERING MECHANISM AND METHOD OF OPERATION THEREOF

CROSS-REFERENCE TO RELATED APPLICATION(S)

The present application contains subject matter related to a concurrently filed U.S. patent application by Gregory Stewart Aist, Jose Sebastian, Aliasgar Mumtaz Husain, and Casey Carter entitled "NAVIGATION SYSTEM WITH ROUTE GUIDANCE MECHANISM AND METHOD OF OPERATION THEREOF." The related application is assigned to Telenav, Inc. and is identified by 14/160,002. The subject matter thereof is incorporated herein by reference thereto.

The present application contains subject matter related to a concurrently filed U.S. patent application by Gregory Stewart Aist, Jose Sebastian, Aliasgar Mumtaz Husain, and Casey Carter entitled "NAVIGATION SYSTEM WITH LANDMARK RECOGNITION MECHANISM AND METHOD OF OPERATION THEREOF." The related application is assigned to Telenav, Inc. and is identified by 14/160,097. The subject matter thereof is incorporated herein by reference thereto.

TECHNICAL FIELD

The present invention relates generally to a navigation system, and more particularly to a system with data gathering mechanism.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world." One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, a navigation system improving data gathering mechanism to adjust reference point has become a paramount concern for the consumer. The inability decreases the benefit of using the tool.

Thus, a need still remains for a navigation system with data gathering mechanism to adjust the current location of a device. In view of the increasing mobility of the workforce and social interaction, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: determining a travel context based on a travel condition; determining a source type with a control unit based on the travel context for providing a candidacy factor; and determining a candidate landmark based on the candidacy factor from the source type suited for the travel context.

The present invention provides a navigation system, including: a control unit for: determining a travel context based on a travel condition, determining a source type based on the travel context for providing a candidacy factor, determining a candidate landmark based on the candidacy factor from the source type suited for the travel context, generating a navigation guidance based on the candidate landmark, and a communication interface, coupled to the control unit, for communicating the navigation guidance for presenting on a device.

The present invention provides a navigation system having a non-transitory computer readable medium including: determining a travel context based on a travel condition; determining a source type based on the travel context for providing a candidacy factor; and determining a candidate landmark based on the candidacy factor from the source type suited for the travel context.

Certain embodiments of the invention have other steps or elements in addition to or in place of those mentioned above. The steps or element will become apparent to those skilled in the art from a reading of the following detailed description when taken with reference to the accompanying drawings.

BEST MODE FOR CARRYING OUT THE INVENTION

Figure 1:
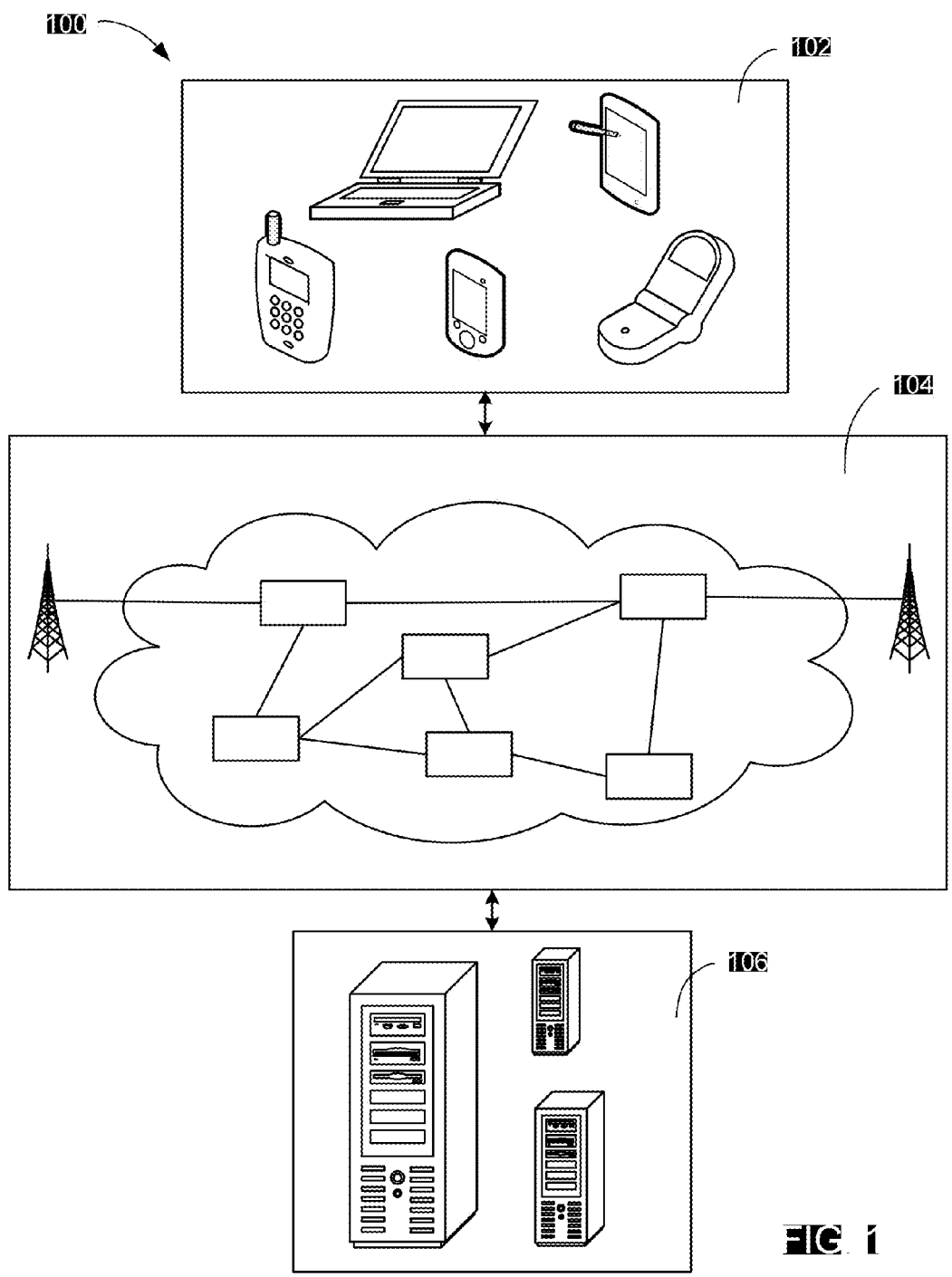
FIG. 1 is a navigation system with data gathering mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the navigation system 100 are semi-diagrammatic and not to scale and, particularly, some of the dimensions are for the clarity of presentation and are shown exaggerated in the drawing FIGS. Similarly, although the views in the drawings for ease of description generally show similar orientations, this depiction in the FIGS. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with data gathering mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer. In another example, the first device 102 can be a particularized machine, such as a mainframe, a server, a cluster server, rack mounted server, or a blade server, or as more specific examples, an IBM System z10™ Business Class mainframe or a HP ProLiant ML™ server.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102. Another example, the first device 102 or the second device 106 can be a particularized machine, such as a portable computing device, a thin client, a notebook, a netbook, a smartphone, a tablet, a personal digital assistant, or a cellular phone, and as specific examples, an Apple iPhone™, Android™ smartphone, or Windows™ platform smartphone.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
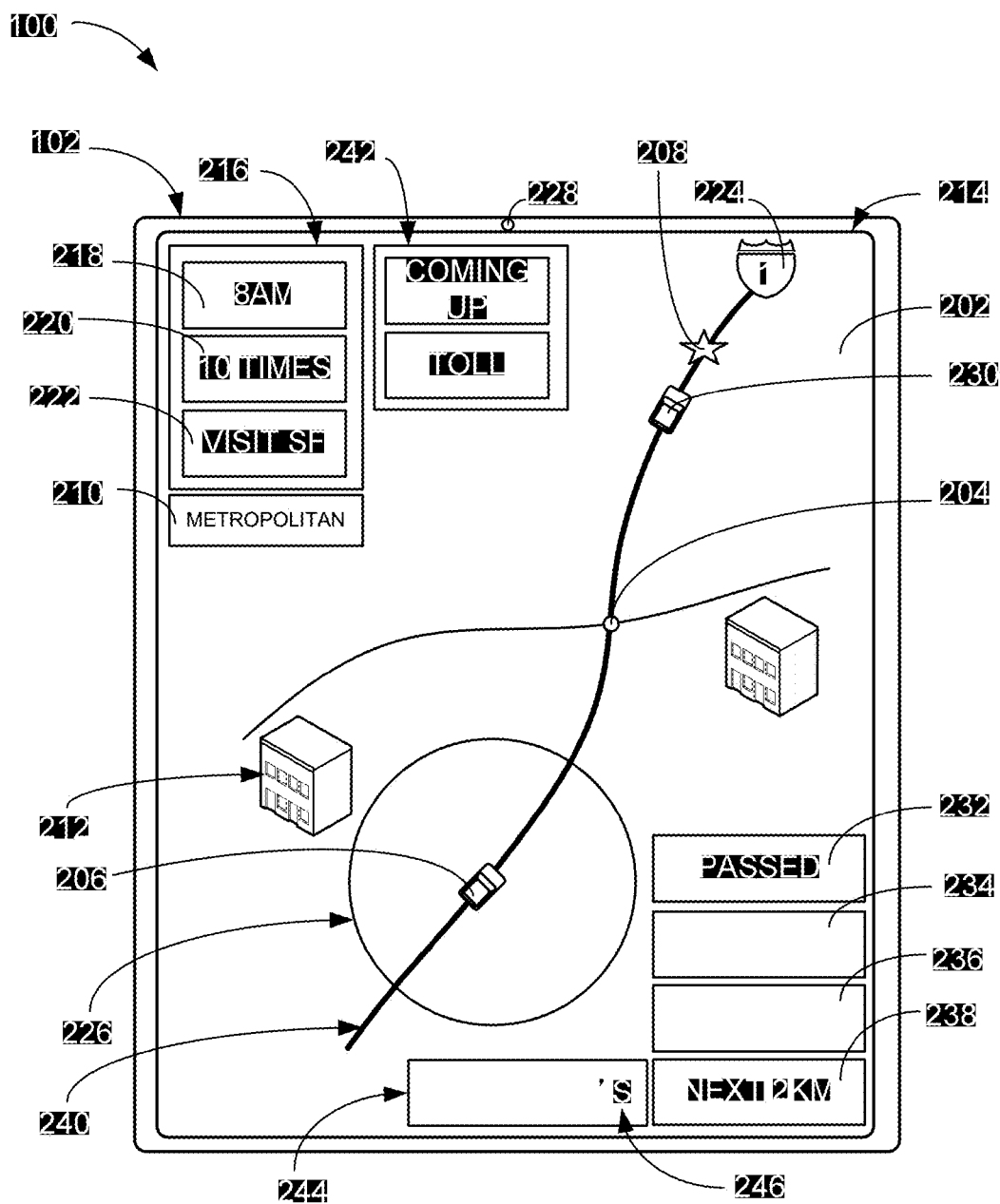
FIG. 2 is an example of a geographic area traveled by the user of the navigation system.

Referring now to FIG. 2, there is shown an example of a geographic area 202 traveled by the user of the navigation system 100. For clarity and brevity, the discussion of the embodiment of the present invention will focus on the first device 102 delivering the result generated by the navigation system 100. However, the second device 106 of FIG. 1 and the first device 102 can be discussed interchangeably.

The geographic area 202 can represent a metropolitan area, a rural area, or a combination thereof. The geographic area 202 can also represent a neighborhood, a city, a county, a state, a country, or a combination thereof. A geographic location 204 is defined as a place or a position in the geographic area 202. For example, the geographic location 204 can represent a building, a street intersection, a national park, or a combination thereof. The first device 102 can display the geographic area 202, the geographic location 204, or a combination thereof.

A current location 206 is defined as a position of the first device 102. A target destination 208 is defined as the geographic location 204 where the travel ends. For example, the target destination 208 can represent a waypoint, endpoint, or a combination thereof.

A geography feature 210 is defined as a characteristic of the geographic area 202, the geographic location 204, or a combination thereof. For example, the geography feature 210 of the geographic area 202 can represent a city, a farmland, a suburb, or a combination thereof. An architecture feature 212 is defined as a manmade characteristic for the geographic location 204. For example, the geographic location 204 can represent a house and the architecture feature 212 of the house can represent Victorian style.

A travel context 214 is defined as a situation, circumstance, or a combination thereof surrounding the first device 102. For example, the travel context 214 can be determined based on a travel condition 216. The travel condition 216 can include a travel time 218, a travel history 220, a travel theme 222, a road type 224, a visible radius 226, or a combination thereof.

The travel time 218 is defined as a time frame. For example, the travel time 218 can represent a time of day, week, month, year, or a combination thereof. For another example, the travel time 218 can represent a time span of day, week, month, year, or a combination thereof. The travel history 220 is defined as log of the user's travel. For example, the travel history 220 can indicate a frequency of how many times the user had traveled within the geographic area 202, had traveled to the geographic location 204, or a combination thereof logged by the first device 102 having the navigation system 100.

The travel theme 222 is a purpose for the travel. For example, the travel theme 222 can represent going for dinner in the geographic area 202 representing San Francisco, Calif. The road type 224 is a classification of a road. For example, the road type 224 can include local road, arterial road, express way, high occupancy vehicle lane, freeway, or a combination thereof. The visible radius 226 is a distance from the current location 206 to the geographic location 204 perceptible. For example, the visible radius 226 can represent the distance from the current location 206 where the user of the navigation system 100 can see the geographic location 204. For another example, the visible radius 226 can represent the distance from the current location 206 where a capturing sensor 228 can detect an object 230, the geographic location 204, or a combination thereof.

The capturing sensor 228 is defined as a device that captures the travel condition 216 surrounding the first device 102. The object 230 can include a person, a vehicle, a road fixture, a building, or a combination thereof.

The travel condition 216 can include a past condition 232, a present condition 234, a future condition 236, a continuing condition 238, or a combination thereof. The past condition 232 is defined as a situation that had already occurred. For example, if the user had passed by the geographic location 204 representing a railroad track, the fact that the user had drove over the railroad track can represent the past condition 232. The present condition 234 is defined as a situation currently occurring. For example, if the user is sitting on a red light, the fact that the user is stopped and waiting for the light to turn green can represent the present condition 234. The future condition 236 is defined as a situation that can occur in the travel. For example, if the user is going on a freeway from a local road as the user travels on a travel route 240, the freeway segment of the travel route 240 subsequent to the local road can represent the future condition 236. The travel route 240 is defined as a path to reach the target destination 208.

The travel context 214 can include a spatial-temporal context 242. The spatial-temporal context 242 can represent a situation, circumstance, or a combination thereof having a time component and physical component. For example, the spatial-temporal context 242 can represent a combination of the future condition 236 and the geographic location 204 to describe the situation. More specifically, the future condition 236 can represent "4 minutes from now traveling along the travel route 240." The geographic location 204 can represent the toll booth. The spatial-temporal context 242 can represent the travel context 214 that illustrates the combination of the temporal component and the physical component to aid the user's travel.

A category of interest 244 is defined as a classification of the object 230, the geographic location 204, the geographic area 202, or a combination thereof. For example, if the geographic location 204 serves Chinese food, the category of interest 244 can represent a restaurant. A brand 246 can represent a commercial label to distinguish from one instance of the geographic location 204 from another instance of the geographic location 204. For example, the golden arches can represent the brand 246 to distinguish McDonald's from other instance of the category of interest 244 representing fast food hamburger eateries.

Figure 3:
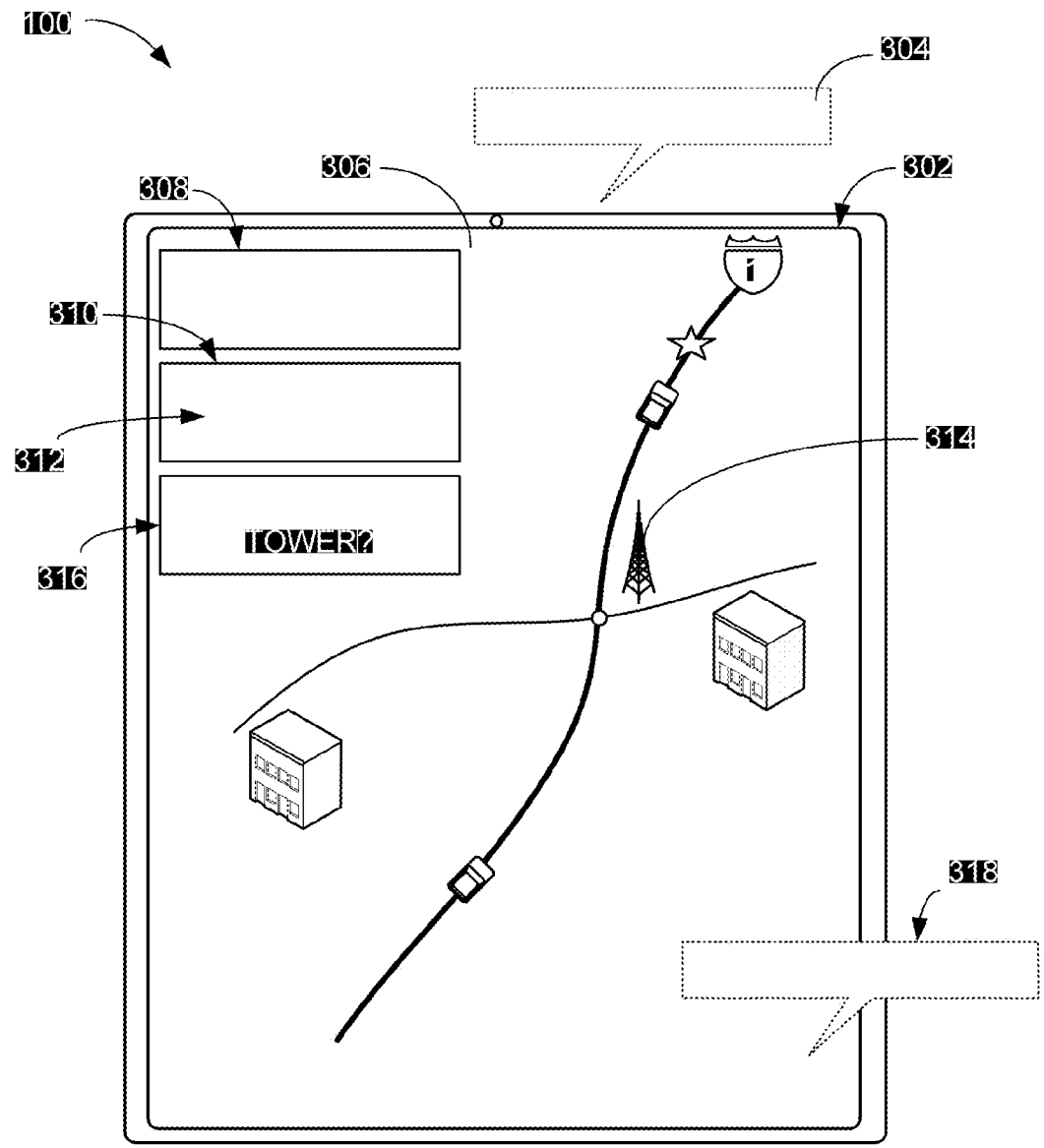
FIG. 3 is an example of a navigation guidance.

Referring now to FIG. 3, there is shown an example of a navigation guidance 302. The navigation guidance 302 is defined as information provided by the navigation system 100 to aid the user' travel. For example, the navigation guidance 302 can represent an audio guidance 304, a visual guidance 306, or a combination thereof. The audio guidance 304 can represent the navigation guidance 302 presented by sound. The visual guidance 306 can represent the navigation guidance 302 displayed on the first device 102.

The navigation guidance 302 can include a landmark based guidance 308, a pre-emptive guidance 310, or a combination thereof having a guidance description 312. The guidance description 312 is defined as the detail of the navigation information to aid the user's travel. The landmark based guidance 308 is defined as the navigation guidance 302 having the guidance description 312 using a guidance landmark 314 to aid the user's travel. The guidance landmark 314 is defined as a conspicuous reference to aid the user's travel. For example, the guidance landmark 314 can be the geographic location 204 of FIG. 2 representing the Empire State Building in New York City. The guidance description 312 of the landmark based guidance 308 can represent "Your destination is across from the front entrance of Empire State Building."

The pre-emptive guidance 310 is defined as the navigation guidance 302 having the travel condition 216 of FIG. 2 in the guidance description 312 to provide the travel context 214 of FIG. 2 for the user's travel. For example, the pre-emptive guidance 310 can include the past condition 232 of FIG. 2, the present condition 234 of FIG. 2, the future condition 236 of FIG. 2, or a combination thereof in the guidance description 312. For a specific example, the guidance description 312 for the pre-emptive guidance 310 can include the present condition 234 such as "You are halfway across the San Mateo Bridge" indicating that the user has traveled half the distance of a bridge as the travel context 214.

The navigation guidance 302 can include a conversational guidance 316. The conversational guidance 316 is defined as the navigation guidance 302 that expects a user's response 318. The user's response 318 is defined as a user's entry in response to the information presented by the navigation system 100. For example, the conversational guidance 316 can pose a question to the user to aid the navigation system 100 to make a decision on what information to present on the first device 102. The user's response 318 can represent manual entry, audio response, biometric entry, or a combination thereof. The biometric entry can include fingerprint entry, retina scan, or a combination thereof.

Figure 4:
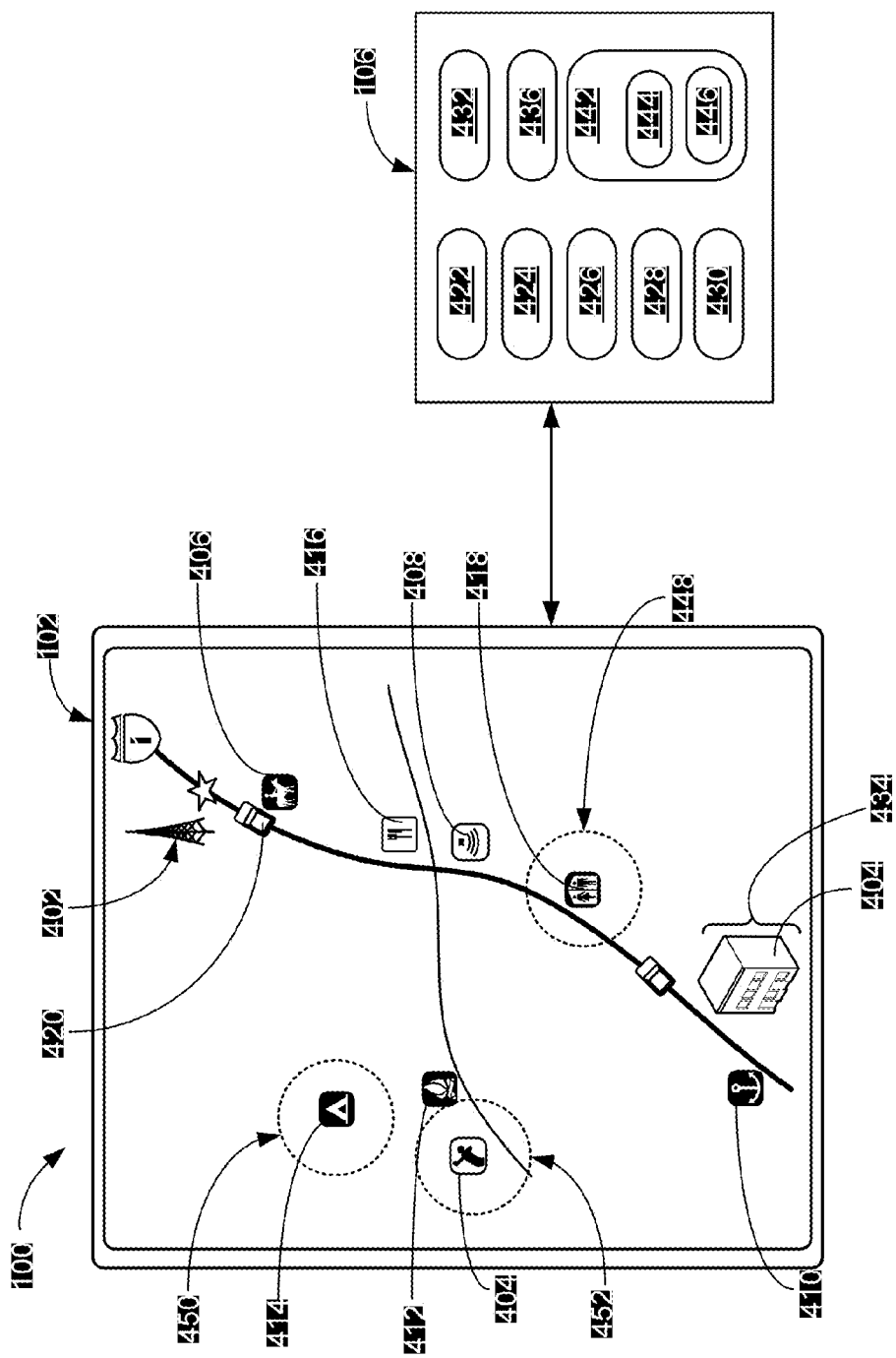
FIG. 4 is an example of the guidance landmark of FIG. 3.

Referring now to FIG. 4, there is shown an example of the guidance landmark 314 of FIG. 3. The guidance landmark 314 can be determined from one instance of a candidate landmark 402 or a plurality of the candidate landmark 402. The candidate landmark 402 is defined as the object 230 of FIG. 2, the geographic location 204 of FIG. 2, the geographic area 202 of FIG. 2, or a combination thereof considered to become the guidance landmark 314. FIG. 4 can illustrate the first device 102 interacting with the second device 106 for the navigation system 100 to determine the guidance landmark 314 out of a plurality of the candidate land mark 402.

For example, the candidate landmark 402 can include a popular landmark 404, web cited landmark 406, a sizable landmark 408, a historical landmark 410, a geography landmark 412, an architectural landmark 414, a categorized landmark 416, a personal landmark 418, a dynamic reference 420, or a combination thereof. The popular landmark 404 is defined as a navigation reference decided according to the frequency of visits. For example, the popular landmark 404 can represent object 230, the geographic location 204, the geographic area 202 selected as the candidate landmark 402 based on the travel history 220 of FIG. 2. More specifically, the geographic location 204 is selected as the popular landmark 404 based on a travel threshold 422, a destination frequency 424, a proximity frequency 426, or a combination thereof.

The travel threshold 422 is defined as the minimum number visits to the geographic location 204, the target destination 208 of FIG. 2, or a combination thereof. For example, the travel threshold 422 can represent a number of visits greater than zero. The destination frequency 424 is defined as the number of visits to the geographic location 204, the target destination 208, or a combination thereof. The proximity frequency 426 is defined as the number of times passing by the geographic location 204, the geographic area 202, or a combination thereof during the user's travel.

The web cited landmark 406 is defined as a navigation reference determined according to the information on the Internet. For example, the web cited landmark 406 can represent object 230, the geographic location 204, the geographic area 202, or a combination thereof selected as the candidate landmark 402 based on web information 428, a presence frequency 430, a presence threshold 432, or a combination thereof. The web information 428 can represent content found on the Internet regarding the object 230, the geographic location 204, the geographic area 202, or a combination thereof. The presence frequency 430 is defined as a number of appearances for the web information 428 regarding the object 230, the geographic location 204, the geographic area 202, or a combination thereof. For example, the presence frequency 430 can represent a number of search results on the Internet related to the geographic location 204. For another example, the web information 428 can represent a number of followers on a social network site for the geographic location 204. For further example, the web information 428 can represent a number of ratings for the geographic location 204. The presence threshold 432 is defined as a minimum number of the presence frequency 430. For example, the presence threshold 432 can represent a value of the presence frequency 430 greater than zero.

The sizable landmark 408 is defined as a navigation reference having a location dimension 434. For example, the sizable landmark 408 can represent the object 230, the geographic location 204, the geographic area 202, or a combination thereof selected as the candidate landmark 402 based on the location dimension 434, a dimension threshold 436, or a combination thereof. The location dimension 434 is defined as a spatial attribute of the object 230, the geographic location 204, the geographic area 202, or a combination thereof. For example, the location dimension 434 can represent a height, a width, a length, a diameter, a radius, a volume, or a combination thereof. The dimension threshold 436 is defined as a minimum requirement for the location dimension 434.

The historical landmark 410 is defined as a navigation reference having historical significance. For example, the historical landmark 410 can represent the object 230, the geographic location 204, the geographic area 202, or a combination thereof selected as the candidate landmark 402 based on a location history 438, a history threshold 440, or a combination thereof. The location history 438 is defined an aggregate of event from the past to present for the object 230, the geographic location 204, the geographic area 202, or a combination thereof. For example, the location history 438 can represent the age of the object 230, the geographic location 204, the geographic area 202, or a combination thereof. The history threshold 440 is defined as the minimum instance of the location history 438 of the object 230, the geographic location 204, the geographic area 202, or a combination thereof. For example, the history threshold 440 can represent the number of years present at the geographic location 204 greater than zero.

The geography landmark 412 is defined as a navigation reference having a geographical attribute. For example, the geography landmark 412 can represent the object 230, the geographic location 204, the geographic area 202, or a combination thereof selected as the candidate landmark 402 based on the geography feature 210 of FIG. 2. For example, the geography landmark 412 can represent natural landscape, such as river, lake, mountain, or a combination thereof. For another example, the geography landmark 412 can represent manmade structure, such as the road type 224 in particular instance of the geographic area 202.

The architectural landmark 414 is defined as a navigation reference with the architecture feature 212 of FIG. 2. For example, the architectural landmark 414 can represent the object 230, the geographic location 204, the geographic area 202, or a combination thereof selected as the candidate landmark 402 based on the architecture feature 212. For example, the architectural landmark 414 can represent a building with an Art Deco style.

The categorized landmark 416 is defined as a navigation reference categorized according to the category of interest 244 of FIG. 2. For example, the categorized landmark 416 can represent the object 230, the geographic location 204, the geographic area 202, or a combination thereof selected as the candidate landmark 402 based on the category of interest 244. For example, the category of interest 244 can represent restaurant. The categorized landmark 416 can represent the geographic location 204 representing a French restaurant.

The personal landmark 418 is defined as a personalized navigation reference. For example, the personal landmark 418 can represent the object 230, the geographic location 204, the geographic area 202, or a combination thereof selected as the candidate landmark 402 based on a user profile 442. The user profile 442 is defined as user's personal information. For example, the user profile 442 can include a user's interest 444. For example, the user's interest 444 can include user's preference to certain type of cuisine, entertainment, sports, or a combination thereof. The user profile 442 can include a vehicle type 446. For example, the vehicle type 446 can represent gasoline vehicle, electric vehicle, or hybrid vehicle as the user's choice for mode of transportation.

For a different example, the personal landmark 418 can include a turn frequently taken by the user. More specifically, the user can usually merge from California 92 to Interstate 280 South, but for a particular trip the merge was at the same exit but heading north. The navigation system 100, the navigation guidance 302 of FIG. 3 can represent "Take California 92 to 280 as if you were going to work, but head North on 280."

The dynamic reference 420 is defined as a navigation reference that can continuously change. For example, the dynamic reference 420 can represent the object 230, the geographic location 204, the geographic area 202, or a combination thereof selected as the candidate landmark 402 based on the travel context 214 of FIG. 2, the visible radius 226 of FIG. 2, or a combination thereof. For further example, the dynamic reference 420 can represent a moving vehicle, a digital display of a billboard, or a combination thereof.

The guidance landmark 314 can be categorized according to a user's landmark 448, a network's landmark 450, a societal landmark 452, or a combination thereof. The user's landmark 448 is defined as the guidance landmark 314 unshared. For example, the user's landmark 448 can represent the user's personal instance of the guidance landmark 314 unshared to other users. The network's landmark 450 is defined as the guidance landmark 314 shared amongst a user's contacts. For example, the network's landmark 450 can represent the guidance landmark 314 to user's friend in a social network site. The societal landmark 452 is defined as the guidance landmark 314 available to the public. For example, the societal landmark 452 can represent the guidance landmark 314 used by all people, inside and outside the user's network.

Figure 5:
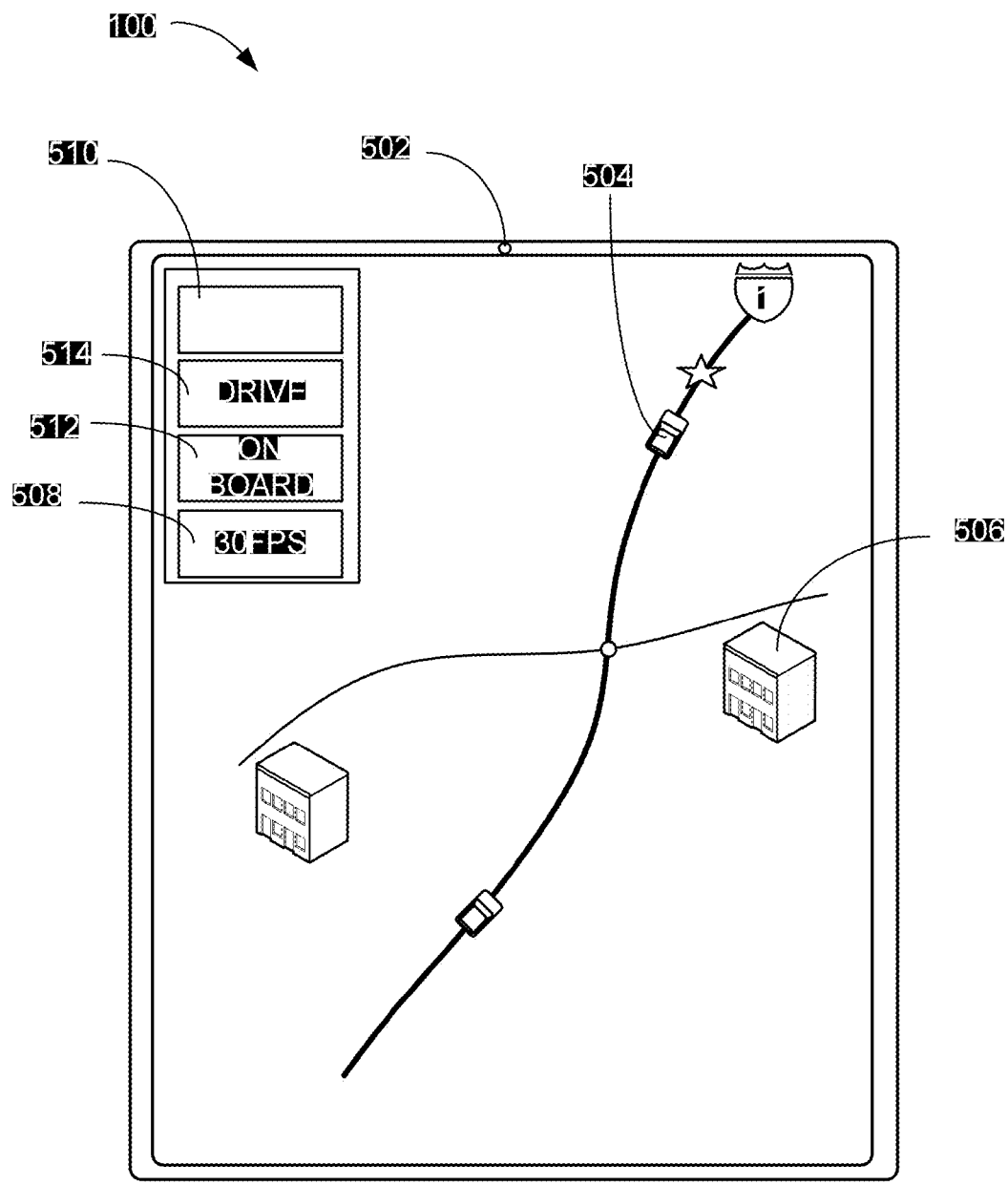
FIG. 5 is an example of a source type for providing a candidacy factor.

Referring now to FIG. 5, therein is shown an example of a source type 502 for providing a candidacy factor 504. The source type 502 is defined as a provider of the candidacy factor 504. The candidacy factor 504 is defined as information considered to determine the candidate landmark 402. For example, the source type 502 can represent the capturing sensor 228 of FIG. 2, external sources, such as websites, or a combination thereof. The candidacy factor 504 can represent digital photograph captured by the capturing sensor 228. For another example, the candidacy factor 504 can represent the web information 428 of FIG. 4.

A gathering opportunity 506 is defined as a situation or condition favorable for attaining the candidacy factor 504. For example, the gathering opportunity 506 can be more ample in the geographic area 202 of FIG. 2 representing the metropolitan area because the capturing sensor 228 can capture the object 230 of FIG. 2, the geographic location 204 of FIG. 2, or a combination thereof more frequently than the geographic area 202 representing the rural area.

A capturing frequency 508 is defined as a rate of capturing by the capturing sensor 228 within a specific time frame. For example, the capturing frequency 508 can capture the object 230 at 30 frames per second. A sensor type 510 is defined as the categorization of the capturing sensor 228. For example, the sensor type 510 can represent the capturing sensor 228 for the first device 102 of FIG. 1 or the capturing sensor 228 of the second device 106 of FIG. 1.

The user of the navigation system 100 can have a preferred source 512 for the source type 502. The preferred source 512 is defined as a favored instance of the source type 502. For example, the user can favor the capturing sensor 228 as the preferred source 512 to provide the candidacy factor 504 over the external sources, such as a website, providing the candidacy factor 504.

A travel mode 514 is defined as a manner of transportation. For example, the travel mode 514 can represent operating a vehicle for traveling. For another example, the travel mode 514 can represent walking for traveling.

Figure 6:
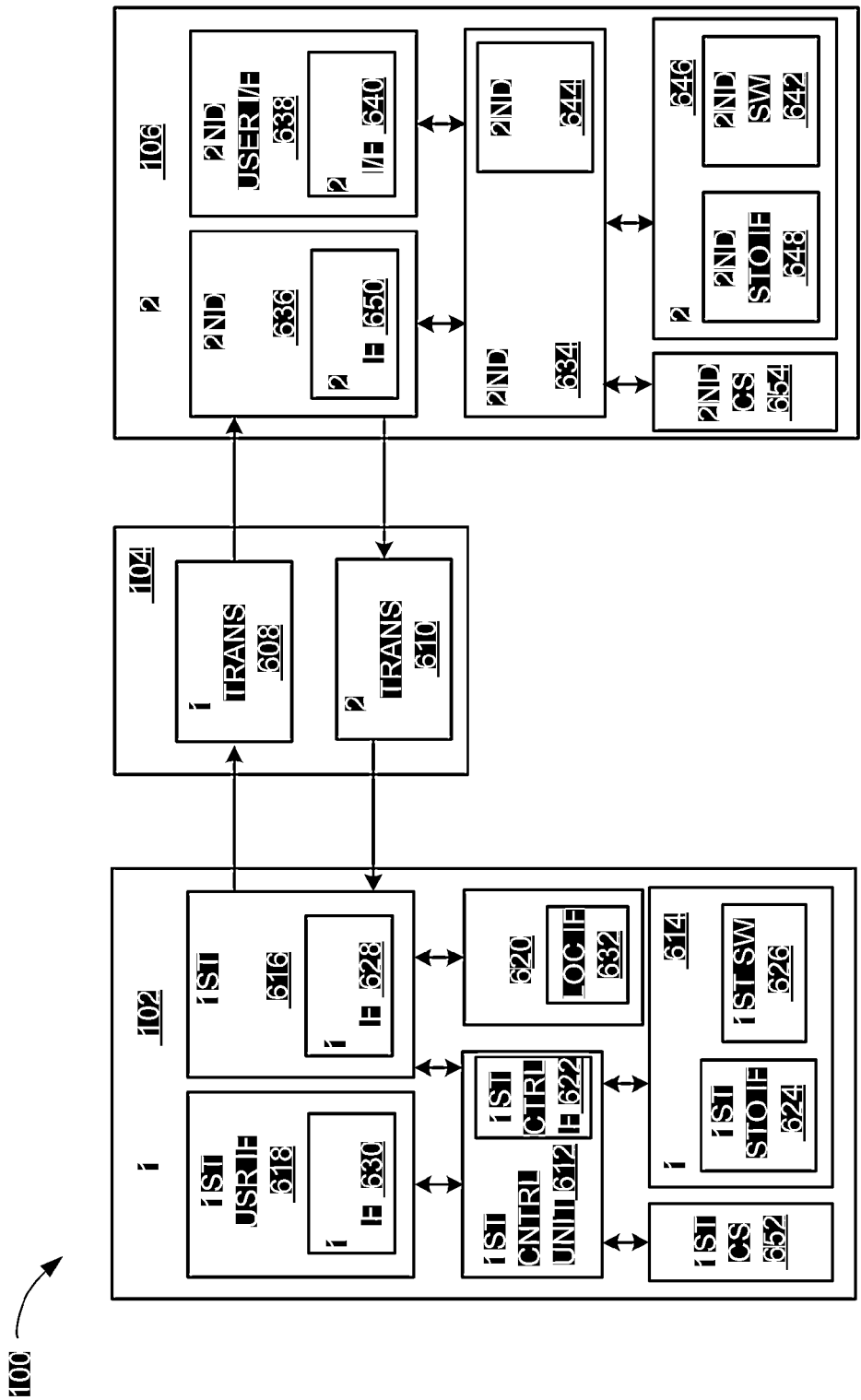
FIG. 6 is an exemplary block diagram of the navigation system.

Referring now to FIG. 6, therein is shown an exemplary block diagram of the navigation system 100. The navigation system 100 can include the first device 102, the communication path 104, and the second device 106. The first device 102 can send information in a first device transmission 608 over the communication path 104 to the second device 106. The second device 106 can send information in a second device transmission 610 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 612, a first storage unit 614, a first communication unit 616, a first user interface 618, and a location unit 620. The first control unit 612 can include a first control interface 622. The first control unit 612 can execute a first software 626 to provide the intelligence of the navigation system 100. The first control unit 612 can be implemented in a number of different manners. For example, the first control unit 612 can be a processor, an embedded processor, a microprocessor, a hardware control logic, a hardware finite state machine (FSM), a digital signal processor (DSP), or a combination thereof. The first control interface 622 can be used for communication between the first control unit 612 and other functional units in the first device 102. The first control interface 622 can also be used for communication that is external to the first device 102.

The first control interface 622 can receive information from the other functional units or from external sources, or can transmit information to the other functional units or to external destinations. The external sources and the external destinations refer to sources and destinations physically separate from the first device 102.

The first control interface 622 can be implemented in different ways and can include different implementations depending on which functional units or external units are being interfaced with the first control interface 622. For example, the first control interface 622 can be implemented with a pressure sensor, an inertial sensor, a microelectromechanical system (MEMS), optical circuitry, waveguides, wireless circuitry, wireline circuitry, or a combination thereof.

The location unit 620 can generate location information, current heading, and current speed of the first device 102, as examples. The location unit 620 can be implemented in many ways. For example, the location unit 620 can function as at least a part of a global positioning system (GPS), an inertial navigation system, a cellular-tower location system, a pressure location system, or any combination thereof.

The location unit 620 can include a location interface 632. The location interface 632 can be used for communication between the location unit 620 and other functional units in the first device 102. The location interface 632 can also be used for communication that is external to the first device 102.

The location interface 632 can receive information from the other functional units or from external sources, or can transmit information to the other functional units or to external destinations. The external sources and the external destinations refer to sources and destinations physically separate from the first device 102.

The location interface 632 can include different implementations depending on which functional units or external units are being interfaced with the location unit 620. The location interface 632 can be implemented with technologies and techniques similar to the implementation of the first control interface 622.

The first storage unit 614 can store the first software 626. The first storage unit 614 can also store the relevant information, such as advertisements, points of interest (POI), navigation routing entries, or any combination thereof.

The first storage unit 614 can be a volatile memory, a nonvolatile memory, an internal memory, an external memory, or a combination thereof. For example, the first storage unit 614 can be a nonvolatile storage such as non-volatile random access memory (NVRAM), Flash memory, disk storage, or a volatile storage such as static random access memory (SRAM).

The first storage unit 614 can include a first storage interface 624. The first storage interface 624 can be used for communication between the location unit 620 and other functional units in the first device 102. The first storage interface 624 can also be used for communication that is external to the first device 102.

The first storage interface 624 can receive information from the other functional units or from external sources, or can transmit information to the other functional units or to external destinations. The external sources and the external destinations refer to sources and destinations physically separate from the first device 102.

The first storage interface 624 can include different implementations depending on which functional units or external units are being interfaced with the first storage unit 614. The first storage interface 624 can be implemented with technologies and techniques similar to the implementation of the first control interface 622.

The first communication unit 616 can enable external communication to and from the first device 102. For example, the first communication unit 616 can permit the first device 102 to communicate with the second device 106, an attachment, such as a peripheral device or a computer desktop, and the communication path 104.

The first communication unit 616 can also function as a communication hub allowing the first device 102 to function as part of the communication path 104 and not limited to be an end point or terminal unit to the communication path 104. The first communication unit 616 can include active and passive components, such as microelectronics or an antenna, for interaction with the communication path 104.

The first communication unit 616 can include a first communication interface 628. The first communication interface 628 can be used for communication between the first communication unit 616 and other functional units in the first device 102. The first communication interface 628 can receive information from the other functional units or can transmit information to the other functional units.

The first communication interface 628 can include different implementations depending on which functional units are being interfaced with the first communication unit 616. The first communication interface 628 can be implemented with technologies and techniques similar to the implementation of the first control interface 622.

The first user interface 618 allows a user (not shown) to interface and interact with the first device 102. The first user interface 618 can include an input device and an output device. Examples of the input device of the first user interface 618 can include a keypad, a touchpad, soft-keys, a keyboard, a microphone, a camera, or any combination thereof to provide data and communication inputs.

The first user interface 618 can include a first display interface 630. The first display interface 630 can include a display, a projector, a video screen, a speaker, a headset, or any combination thereof.

The first control unit 612 can operate the first user interface 618 to display information generated by the navigation system 100. The first control unit 612 can also execute the first software 626 for the other functions of the navigation system 100, including receiving location information from the location unit 620. The first control unit 612 can further execute the first software 626 for interaction with the communication path 104 via the first communication unit 616.

The second device 106 can be optimized for implementing the present invention in a multiple device embodiment with the first device 102. The second device 106 can provide the additional or higher performance processing power compared to the first device 102. The second device 106 can include a second control unit 634, a second communication unit 636, and a second user interface 638.

The second user interface 638 allows a user (not shown) to interface and interact with the second device 106. The second user interface 638 can include an input device and an output device. Examples of the input device of the second user interface 638 can include a keypad, a touchpad, softkeys, a keyboard, a microphone, a camera, or any combination thereof to provide data and communication inputs. Examples of the output device of the second user interface 638 can include a second display interface 640. The second display interface 640 can include a display, a projector, a video screen, a speaker, a headset, or any combination thereof.

The second control unit 634 can execute a second software 642 to provide the intelligence of the second device 106 of the navigation system 100. The second software 642 can operate in conjunction with the first software 626. The second control unit 634 can provide additional performance compared to the first control unit 612.

The second control unit 634 can operate the second user interface 638 to display information. The second control unit 634 can also execute the second software 642 for the other functions of the navigation system 100, including operating the second communication unit 636 to communicate with the first device 102 over the communication path 104.

The second control unit 634 can be implemented in a number of different manners. For example, the second control unit 634 can be a processor, an embedded processor, a microprocessor, a hardware control logic, a hardware finite state machine (FSM), a digital signal processor (DSP), or a combination thereof.

The second control unit 634 can include a second control interface 644. The second control interface 644 can be used for communication between the second control unit 634 and other functional units in the second device 106. The second control interface 644 can also be used for communication that is external to the second device 106.

The second control interface 644 can receive information from the other functional units or from external sources, or can transmit information to the other functional units or to external destinations. The external sources and the external destinations refer to sources and destinations physically separate from the second device 106.

The second control interface 644 can be implemented in different ways and can include different implementations depending on which functional units or external units are being interfaced with the second control interface 644. For example, the second control interface 644 can be implemented with a pressure sensor, an inertial sensor, a microelectromechanical system (MEMS), optical circuitry, waveguides, wireless circuitry, wireline circuitry, or a combination thereof.

A second storage unit 646 can store the second software 642. The second storage unit 646 can also store the relevant information, such as advertisements, points of interest (POI), navigation routing entries, or any combination thereof. The second storage unit 646 can be sized to provide the additional storage capacity to supplement the first storage unit 614.

For illustrative purposes, the second storage unit 646 is shown as a single element, although it is understood that the second storage unit 646 can be a distribution of storage elements. Also for illustrative purposes, the navigation system 100 is shown with the second storage unit 646 as a single hierarchy storage system, although it is understood that the navigation system 100 can have the second storage unit 646 in a different configuration. For example, the second storage unit 646 can be formed with different storage technologies forming a memory hierarchal system including different levels of caching, main memory, rotating media, or off-line storage.

The second storage unit 646 can be a volatile memory, a nonvolatile memory, an internal memory, an external memory, or a combination thereof. For example, the second storage unit 646 can be a nonvolatile storage such as non-volatile random access memory (NVRAM), Flash memory, disk storage, or a volatile storage such as static random access memory (SRAM).

The second storage unit 646 can include a second storage interface 648. The second storage interface 648 can be used for communication between the location unit 620 and other functional units in the second device 106. The second storage interface 648 can also be used for communication that is external to the second device 106.

The second storage interface 648 can receive information from the other functional units or from external sources, or can transmit information to the other functional units or to external destinations. The external sources and the external destinations refer to sources and destinations physically separate from the second device 106.

The second storage interface 648 can include different implementations depending on which functional units or external units are being interfaced with the second storage unit 646. The second storage interface 648 can be implemented with technologies and techniques similar to the implementation of the second control interface 644.

The second communication unit 636 can enable external communication to and from the second device 106. For example, the second communication unit 636 can permit the second device 106 to communicate with the first device 102 over the communication path 104.

The second communication unit 636 can also function as a communication hub allowing the second device 106 to function as part of the communication path 104 and not limited to be an end point or terminal unit to the communication path 104. The second communication unit 636 can include active and passive components, such as microelectronics or an antenna, for interaction with the communication path 104.

The second communication unit 636 can include a second communication interface 650. The second communication interface 650 can be used for communication between the second communication unit 636 and other functional units in the second device 106. The second communication interface 650 can receive information from the other functional units or can transmit information to the other functional units.

The second communication interface 650 can include different implementations depending on which functional units are being interfaced with the second communication unit 636. The second communication interface 650 can be implemented with technologies and techniques similar to the implementation of the second control interface 644.

The first communication unit 616 can couple with the communication path 104 to send information to the second device 106 in the first device transmission 608. The second device 106 can receive information in the second communication unit 636 from the first device transmission 608 of the communication path 104.

The second communication unit 636 can couple with the communication path 104 to send information to the first device 102 in the second device transmission 610. The first device 102 can receive information in the first communication unit 616 from the second device transmission 610 of the communication path 104. The navigation system 100 can be executed by the first control unit 612, the second control unit 634, or a combination thereof.

A first capturing sensor 652 can represent the capturing sensor 228 of FIG. 2. The first capturing sensor 652 can capture the inanimate object location 230 of FIG. 2 in the traversal context 218 of FIG. 2. The first capturing sensor 652 can capture the inanimate object location 230 from the outside, the inside, or the combination thereof of the user's vehicle. Examples of the first capturing sensor 652 can include a digital camera, video camera, thermal camera, night vision camera, infrared camera, x-ray camera, or the combination thereof. Examples of the first capturing sensor 652 can include accelerometer, thermometer, microphone, wireless signal receiver, remote physiological monitoring device, light identifier, or the combination thereof.

A second capturing sensor 654 can represent the capturing senor 228. The second capturing sensor 654 can capture the inanimate object location 230 in the traversal context 218. The second capturing sensor 654 can capture the inanimate object location 230 from the outside, the inside, or the combination thereof of the user's vehicle.

Examples of the second capturing sensor 354 can include a digital camera, video camera, thermal camera, night vision camera, infrared camera, x-ray camera, or the combination thereof. Examples of the second capturing sensor 354 can include accelerometer, thermometer, microphone, wireless signal receiver, remote physiological monitoring device, light identifier, or the combination thereof.

For illustrative purposes, the second device 106 is shown with the partition having the second user interface 638, the second storage unit 646, the second control unit 634, and the second communication unit 636, although it is understood that the second device 106 can have a different partition. For example, the second software 642 can be partitioned differently such that some or all of its function can be in the second control unit 634 and the second communication unit 636. Also, the second device 106 can include other functional units not shown in FIG. 6 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 620, although it is understood that the second device 106 can also operate the location unit 620.

Figure 7:
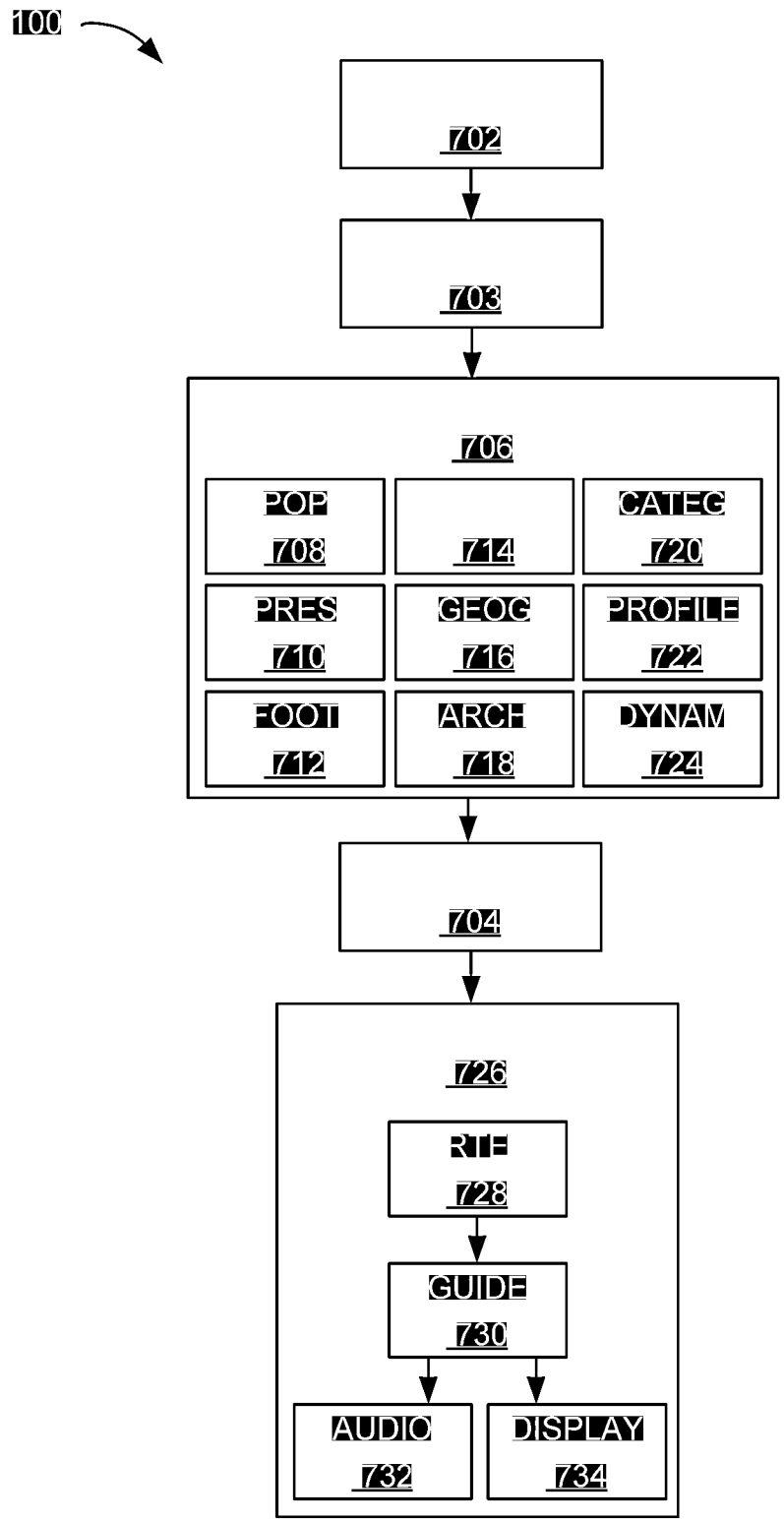
FIG. 7 is a control flow of the navigation system.

Referring now to FIG. 7, therein is shown a control flow of the navigation system 100. The navigation system 100 can include a context module 702. The context module 702 determines the travel context 214 of FIG. 2. For example, the context module 702 can determine the travel context 214 based on the travel condition 216 of FIG. 2.

The context module 702 can determine the travel context 214 in a number of ways. For example, the context module 702 can determine the travel context 214 based on the travel condition 216 surrounding the vehicle with the user of the navigation system 100 operating the first device 102. More specifically, the travel condition 216 can include the travel time 218 of FIG. 2, the travel theme 222 of FIG. 2, the road type 224 of FIG. 2, the current location 206 of FIG. 2, the travel history 220 of FIG. 2, or a combination thereof.

For a specific example, the context module 702 can determine the travel context 214 representing that the user is traveling at night based on the travel time 218 representing 9PM. For another example, the context module 702 can determine the travel context 214 representing that the user is traveling at high speed based on the location unit 620 of FIG. 6 locating the current location 206 on the road type 224 representing a freeway. For further example, the context module 702 can determine the travel context 214 that the user is unfamiliar with the geographic area 202 of FIG. 2 based on the travel history 220 meeting or exceeding the travel threshold 422 of FIG. 4. The context module 702 can send the travel context 214 to a source module 703.

The navigation system 100 can include the source module 703, which can couple to the context module 702. The source module 703 determines the source type 502 of FIG. 5. For example, the source module 703 can determine the source type 502 based on the travel context 214, the user profile 442 of FIG. 4, or a combination thereof. Moreover, the source module 703 can determine the source type 502 suited for the travel context 214 to determine the optimal source for providing the candidacy factor 504 of FIG. 5 for determining the candidate landmark 402 of FIG. 4.

The source module 703 can determine the source type 502 in a number of ways. For example, the source module 703 can determine the source type 502 based on the travel context 214 for traversing through a particular instance of the geographic area 202. For a specific example, the geographic area 202 can represent a metropolitan area. The source module 703 can determine the source type 502 to represent the first capturing sensor 652 of FIG. 6 based on the gathering opportunity 506 of FIG. 5 to capture the object the 230 of FIG. 2, the geographic location 204, or a combination thereof within the metropolitan area. The first capturing sensor 652 can capture a digital photograph, as an example, as the candidacy factor 504 for determining the candidate landmark 402.

More specifically, the gathering opportunity 506 can represent more opportunity for the first capturing sensor 652 to capture the object 230, the geographic location 204, or a combination thereof in the metropolitan area than the gathering opportunity 506 in the geographic area 202 representing a rural area. The gathering opportunity 506 is greater in the metropolitan area is greater than gathering opportunity 506 in the rural area because the instances of the object 230, the geographic location 204, or a combination thereof can be more abundant in the metropolitan area. As a result, the source module 703 can determine the source type 502 as the first capturing sensor 652 if the travel context 214 represents traversing through the geographic area 202 of a metropolitan area. In contrast, the source module 703 can determine the source type 502 as the external sources, such as a website, based on the gathering opportunity 506 representing less opportunity to capture the object 230, the geographic location 204, or a combination thereof. Moreover, the source module 703 can communicate with website via the first control interface 622 of FIG. 6 to provide the web information 428 as the candidacy factor 504 to determine the candidate landmark 402.

For a different example, the travel context 214 can represent traversing through the travel condition 216 of rain. Furthermore, the travel context 214 can represent gloomy and wet, thus, the first capturing sensor 652 may not function optimally. As a result, the source module 703 can determine the source type 502 as the web site for providing a plurality of the candidacy factor 504 representing the web information 428 for the navigation system 100 to determine the candidate landmark 402.

For further example, the source module 703 can determine the capturing frequency 508 of FIG. 5 based on the travel context 214. Continuing with the previous example, the travel context 214 can be traversing in the rain. The source module 703 can determine the capturing frequency 508 of the first capturing sensor 652 as zero to turn off the first capturing sensor 652. Additionally, the source module 703 can determine the capturing frequency 508 of the first capturing sensor 652 as zero if the travel context 214 represents traversing through the rural area because of the lack of the gathering opportunity 506 as discussed above. In contrast, the source module 703 can determine the capturing frequency 508 to be maximum frame rate for the first capturing sensor 652 to capture the object 230, the geographic location 204, or a combination thereof. Moreover, the source module 703 can adjust the capturing frequency 508 within a range of zero to the maximum frame rate by increasing or decreasing the capturing frequency 508 to determine the optimal frame rate for the travel context 214. As an example, the capturing frequency 508 can range from zero to 300 frames per second.

For further example, the source module 703 can determine the capturing frequency 508 of the first capturing sensor 652 and the capturing frequency 508 of the second capturing sensor 654. More specifically, if the capturing frequency 508 for the first capturing sensor 652 is set a higher frame rate, the source module 703 can determine the capturing frequency 508 of the second capturing sensor 654 to be zero to use the first capturing sensor 652 mainly. For another example, if capturing with the first capturing sensor 652 affects the capturing with the second capturing sensor 654 or vice versa, the source module 703 can set the both instances of the capturing frequency 508 at a synchronized frame rate. For further example, if capturing with the first capturing sensor 652 affects the capturing with the second capturing sensor 654 or vice versa, the source module 703 can determine one instance of the capturing frequency 508 with a frame rate that is multiple of another instance of the capturing frequency 508. For further example, if capturing with the first capturing sensor 652 affects the capturing with the second capturing sensor 654 or vice versa, the source module 703 can determine both instances of the capturing sensor 654 to have the capturing timing that is offset from each other so that the first capturing sensor 652 and the second capturing sensor 654 will not capture at the same time, rate, or a combination thereof.

For a different example, the source module 703 can determine the sensor type 510 of FIG. 5 of the source type 502 by selecting between the first capturing sensor 652, the second capturing sensor 654 of FIG. 6, or a combination thereof based on the travel context 214. The first capturing sensor 652 can be part of the first device 102 held by the user of the navigation system 100. The second capturing sensor 654 can be part of the second device 106 representing a satellite to capture satellite images, a traffic/surveillance camera to capture traffic/surveillance images, or a combination thereof.

More specifically, if the travel context 214 can represent traversing through the metropolitan area, the source module 703 can determine the sensor type 510 of the source type 502 to represent the first capturing sensor 652 because of the more ample opportunity to capture the object 230, the geographic location 204, or a combination thereof by the first device 102. In contrast, if the travel context 214 can represent traversing through the rural area, the source module 703 can determine the sensor type 510 of the source type 502 to represent the second capturing sensor 652 to increase the visible radius 226 of FIG. 2 to capture the object 230, the geographic location 204, or a combination thereof.

For a different example, the source module 703 can determine the source type 502 based on the user profile 442. More specifically, the user profile 442 can include the preferred source 512 of FIG. 5. For example, the preferred source 512 can represent the first capturing device 652, the web information 428, the travel history 220, or a combination thereof. For a specific example, the user can find the candidacy factor 504 provided by the first capturing device 652 more trustworthy and set the first capturing device 652 as the preferred source 512. As a result, the source module 703 can determine the source type 502 as the preferred source 512 for all instances of the travel context 214.

For another example, the user profile 442 can include the candidacy factor 504 representing the user's favorite song, "New York" by Alicia Keys. As a result, the user can remember the lyrics to the song. The source module 703 can determine the source type 502 from the lyrics of the user's favorite song for providing the candidacy factor 504.

For another example, the user profile 442 can include the candidacy factor 504 representing the user's historical bias, cultural bias, or a combination thereof. More specifically, the user profile 442 can indicate the user's preference to see Bollywood movies instead of Hollywood movies. The source module 703 can determine the source type 502 related to Bollywood over Hollywood to provide the candidacy factor 504.

For a different example, the source module 703 can determine the source type 502 based on the user profile 442 with the travel history 220 as the candidacy factor 504. The travel history 220 can indicate that the user has never traveled within the geographic area 202. As a result, the source module 703 can determine the source type 502 as every possible resources to provide the candidacy factor 504. More specifically, the source module 703 can determine the first capturing sensor 652, the website, or a combination thereof as the source type 502 based on the travel history 220.

For further example, the source module 703 can change the capturing frequency 508 based on the travel history 220. Continuing with the previous example, the source module 703 can increase the capturing frequency 508 if the travel history 220 indicates no travel record to increase the gathering opportunity 506 for providing the candidacy factor 504. In contrast, the travel history 220 can indicate that the user travels to the geographic area 202 frequently. As a result, the source module 703 can decrease the capturing frequency 508 to reduce the allocation of resources by the navigation system 100 to collect the candidacy factor 504. Moreover, the source module 703 can determine the source type 502 as the first storage unit 614 of FIG. 6. The first storage unit 614 can store the candidacy factor 504 previously collected for future use by the navigation system 100 to determine the candidate landmark 402.

It has been discovered that the navigation system 100 can change the capturing frequency 508 based on the travel history 220 to improve the efficiency of allocating resources by the navigation system 100. By increasing or decreasing the capturing frequency 508 based on the travel history 220, the navigation system 100 can reduce unnecessary allocation of resource to execute the first capturing device 652, the second capturing device 654, or a combination thereof. As a result, the navigation system 100 can reduce inefficient resource allocation for safer operation of the navigation system 100, the vehicle, or a combination thereof.

For a different example, the source module 703 can determine the source type 502 based on the travel mode 514 of FIG. 5. Based on the travel mode 514, the type of the candidacy factor 504 collected by the source type 502 can differ. As a result, the source module 703 can select the source type 502 most optimal for the travel mode 514. For example, the travel mode 514 can represent the user walking with the first device 102. Since the travel speed for walking can be slower than driving, the navigation system 100 can have more ample opportunity for the gathering opportunity 506. As a result, the source module 703 can determine the source type 502 as the first capturing device 652 of the first device 102 held by the user.

In contrast, the travel speed can be faster for driving a vehicle than walking Subsequently, the gathering opportunity 506 can be less ample than when the user is walking As a result, the first capturing device 652 of the first device 102 can be less reliable as the source type 502. Therefore, the source module 703 can determine the source type 502 as the second capturing device 654 of the second device 106 representing a satellite to capture the object 230, the geographic location 204, or a combination thereof to provide the candidacy factor 504. The source module 703 can send the source type 502, the candidacy factor 504, or a combination thereof to a candidate module 706.

The navigation system 100 can include the candidate module 706. The candidate module 706 determines the candidate landmark 402. For example, the candidate module 706 can determine the candidate landmark 402 representing the popular landmark 404 of FIG. 4, the web cited landmark 406 of FIG. 4, the sizable landmark 408 of FIG. 4, the historical landmark 410 of FIG. 4, the geography landmark 412 of FIG. 4, the architectural landmark 414 of FIG. 4, the categorized landmark 416 of FIG. 4, the personal landmark 418 of FIG. 4, the dynamic reference 420 of FIG. 4, or a combination thereof determined. For further example, the candidate module 706 can determine the candidate landmark 402 based on factoring the candidacy factor 504.

The candidate module 706 can determine the candidate landmark 402 in a number of ways. The candidate module 706 can include a popularity module 708. The popularity module 708 determines the popular landmark 404. For example, the popularity module 708 can determine the popular landmark 404 based on the travel history 220.

The popularity module 708 can determine the popular landmark 404 in a number of ways. For example, the popularity module 708 can determine the popular landmark 404 based on the travel history 220 representing the destination frequency 424 of FIG. 4, the proximity frequency 426 of FIG. 4, or a combination thereof.

As an example, the popularity module 708 can determine the popular landmark 404 based on the geographic location 204 of FIG. 2 selected as the target destination 208 of FIG. 2 based on the destination frequency 424. More specifically, the destination frequency 424 can indicate the number of times visited for the geographic location 204 by the user, the user's friend, or a combination thereof. The travel threshold 422 can represent traveling to the geographic location 204 of at least 10 times within the travel time 218 of 1 week. As a result, the popularity module 708 can determine the popular landmark 404 based on the geographic location 204 based on the destination frequency 424 meeting or exceeding the travel threshold 422 of FIG. 4.

For another example, the popularity module 708 can determine the popular landmark 404 based on the proximity frequency 426. More specifically, the popularity module 708 can determine the popular landmark 404 based on the geographic location 204 most frequently passed by the user, the user's friend, or a combination thereof. For further example, the popularity module 708 can determine the popular landmark 404 based on the geographic location 204 within the visible radius 226. As an example, the visible radius 226 can be set as 2 mile radius from the current location 206. The popularity module 708 can determine the popular landmark 404 based on the geographic location 204 within the visible radius 226 frequently passed by according to the proximity frequency 426. The travel threshold 422 can represent passing by the geographic location 204 of at least 10 times within the travel time 218 of 1 week. The popularity module 708 can determine the popular landmark 404 based on the proximity frequency 426 meeting or exceeding the travel threshold 422.

For another example, the popularity module 708 can determine the popular landmark 404 based on the travel history 220, the road type 224, or a combination thereof. More specifically, the travel history 220 indicates the user rarely travels on dirt road. As a result, the popularity module 708 can determine the geographic location 204 as the popular landmark 404 excluding the dirt road. The popularity module 708 can send the popular landmark 404 to the landmark module 704.

The candidate module 706 can include a presence module 710. The presence module 710 determines the web cited landmark 406. For example, the presence module 710 can determine the web cited landmark 406 based on the presence frequency 430 of FIG. 4 of the geographic location 204. The web cited landmark 406 can represent the geographic location 204, the geographic area 202, or a combination thereof.

It has been discovered that the navigation system 100 determining the popular landmark 404 can improve the safety of user operating the vehicle, the navigation system 100, or a combination thereof. By determining the popular landmark 404 as the candidate landmark 406 for the guidance landmark 314 of FIG. 3, the navigation system 100 can improve the user's comfort level of traversing the travel route 240 of FIG. 2 by providing a recognizable navigation reference for the user to rely on. As a result, the increased comfort level allows the user to focus for safer operation of the vehicle, the navigation system 100, or a combination thereof.

The presence module 710 can determine the web cited landmark 406 in a number of ways. For example, the presence module 710 can determine the presence frequency 430 based on the first control interface 622 receiving the candidacy factor 504 representing the web information 428 for the geographic location 204, the geographic area 202, or a combination thereof from the external sources. The web information 428 can represent the name of a website, search engine, social network site, or a combination thereof citing the geographic location 204, the geographic area 202, or a combination thereof.

The presence module 710 can determine the presence frequency 430 based on the web information 428, such a number of web pages citing the geographic location 204, a number of search results generated for the geographic area 202, a number of positive responses, such as "likes," indicated towards the geographic location 204 on a social network site, or a combination thereof. The presence threshold 432 can represent at least 1000 websites, 1 million search results, 600 "likes," or a combination thereof citing the geographic location 204, the geographic area 202, or a combination thereof. The presence module 710 can determine the web cited landmark 406 based on the presence frequency 430 meeting or exceeding the presence threshold 432 of FIG. 4.

For a specific example, the presence frequency 430 for the geographic location 204, such as Haight-Ashbury in San Francisco, Calif. can exceed the presence threshold 432. For another example, the presence frequency 430 for the geographic area 202, such as Greenwich Village in New York City, N.Y. can exceed the presence threshold 432. The presence module 710 can determine Haight-Ashbury, Greenwich Village, or a combination thereof as the web cited landmark 406. The presence module 710 can send the web cited landmark 406 to the landmark module 704.

It has been discovered that the navigation system 100 determining the web cited landmark 406 can improve the safety of user operating the vehicle, the navigation system 100, or a combination thereof. By determining the web cited landmark 406 as the candidate landmark 406 for the guidance landmark 314, the navigation system 100 can improve the user's comfort level for traversing the travel route 240 by providing a recognizable navigation reference for the user to rely on. As a result, the increased comfort level allows the user to focus for safer operation of the vehicle, the navigation system 100, or a combination thereof.

The candidate module 706 can include a footprint module 712. The footprint module 712 determines the sizable landmark 408. For example, the footprint module 712 can determine the sizable landmark 408 based on the location dimension 434 of FIG. 4 meeting or exceeding the dimension threshold 436 of FIG. 4.

The footprint module 712 can determine the sizable landmark 408 in a number of ways. For example, the geographic location 204 can represent a skyscraper. The location dimension 434 representing the height of the skyscraper can be 100 meters tall. The dimension threshold 436 representing the height can represent at least 85 meters. Because the location dimension 434 exceeds the dimension threshold 436, the footprint module 712 can determine the skyscraper as the sizable landmark 408.

For another example, the geographic location 204 can represent a sports stadium. The location dimension 434 representing the volume of the sports stadium can be 19 million cubic meters. The dimension threshold 436 representing the volume can represent at least 10 million cubic meters. Because the location dimension 434 exceeds the dimension threshold 436, the footprint module 712 can determine the sports stadium as the sizable landmark 408. The footprint module 712 can send the sizable landmark 408 to the landmark module 704.

It has been discovered that the navigation system 100 determining the sizable landmark 408 can improve the safety of user operating the vehicle, the navigation system 100, or a combination thereof. By determining the sizable landmark 408 as the candidate landmark 406 for the guidance landmark 314, the navigation system 100 can improve the user's comfort level for traversing the travel route 240 by providing a recognizable navigation reference for the user to rely on. As a result, the increased comfort level allows the user to focus for safer operation of the vehicle, the navigation system 100, or a combination thereof.

The candidate module 706 can include a history module 714. The history module 714 determines the historical landmark 410. For example, the history module 714 can determine the historical landmark 410 based on the location history 438 of FIG. 4 of the geographic location 204.

More specifically, the history module 714 can determine the historical landmark 410 based on the location history 438 meeting or exceeding the history threshold 440 of FIG. 4. As an example, the history threshold 440 can represent at least 10 years for the restaurant to be existent at the geographic location 204. If the location history 438 of the restaurant can represent 15 years, the history module 714 can determine the restaurant as the historical landmark 410 based on the location history 438 exceeding the history threshold 440.

For further example, a building no longer existent can represent the historical landmark 410 based on the location history 438 of the building. For example, the building can have the location history 438 of 60 years. However, the building can perish due to a fire. The history module 714 can still determine the building as the historical landmark 410 based on the location history 438 of the building exceeding the history threshold 440. The history module 714 can send the historical landmark 410 to the landmark module 704.

It has been discovered that the navigation system 100 determining the historical landmark 410 can improve the safety of user operating the vehicle, the navigation system 100, or a combination thereof. By determining the historical landmark 410 as the candidate landmark 406 for the guidance landmark 314, the navigation system 100 can improve the user's comfort level for traversing the travel route 240 by providing a recognizable navigation reference for the user to rely on. As a result, the increased comfort level allows the user to focus for safer operation of the vehicle, the navigation system 100, or a combination thereof.

The candidate module 706 can include a geography module 716. The geography module 716 determines the geography landmark 412. For example, the geography module 716 can determine the geography landmark 412 based on the geography feature 210 of FIG. 2.

The geography module 716 can determine the geography landmark 412 in a number of ways. As an example, one instance of the geography feature 210 can represent a natural landscape, such as river, lake, mountain, or a combination thereof. The geographic area 202 can represent a metropolitan area having instances of the geography feature 210 representing buildings. Having a river, lake, or a combination thereof can represent an anomaly to a metropolitan area where the geographic area 202 can be surrounded by buildings, houses, and roads. The geography module 716 can determine the geography landmark 412 based on comparing the one instance of the geography feature 210 to another instance of the geography feature 210 within the geographic area 202.

For another example, the geography feature 210 can represent the number of lanes for the road type 224 that is a freeway. Generally, the particular freeway can have the geography feature 210 of 4 lanes. However, for a particular instance of the geographic area 202, the freeway can have the geography feature 210 of 6 lanes. The geography module 716 can determine the geography landmark 412 based on comparing the geography feature 210 for the geography feature 210 of one instance of the geographic area 202 to the geography feature 210 of another instance of the geographic area 202. The geography module 716 can send the geography landmark 412 to the landmark module 704.

The candidate module 706 can include an architecture module 718. The architecture module 718 determines the architectural landmark 414. For example, the architecture module 718 can determine the architectural landmark 414 based on the architecture feature 212 of FIG. 2.

The architecture module 718 can determine the architectural landmark 414 in a number of ways. For example, the architecture module 718 can determine the architectural landmark 414 based on the architecture feature 212 of the brand 246 of FIG. 2. For example, the brand 246 can represent McDonald's™. The architecture feature 212 can represent the golden arches of McDonald's™. Based on the architecture feature 212, the architecture module 718 can determine the geographic location 204 with the gold arches to be the architectural landmark 414 representing McDonald's™.

For another example, the architecture module 718 can determine the architectural landmark 414 based on the architecture feature 212 captured by the first capturing sensor 652. More specifically, the first capturing sensor 652 can capture the candidacy factor 504 representing digital image of the architecture feature 212 for each instances of the geographic location 204 within the geographic area 202. The architecture module 718 can determine the architectural landmark 414 based on identifying the architecture feature 212 distinctive amongst the instances of the architecture feature 212 using an image recognition algorithm. Some examples of the image recognition algorithm can include a contour and shape based object recognition method, an appearance-based object recognition method, and anchor point detection algorithm.

For a specific example, the geographic area 202 can predominantly have instances of the geographic location 204 with the architecture feature 212 of Victorian style houses. The geographic area 202 can have an instance of the geographic location 204 with the architecture feature 212 of Contemporary-Modern style house. The architecture module 718 can determine the geographic location 204 with the architecture feature 212 of Contemporary-Modern style house as the architectural landmark 414 by comparing the Contemporary-Modern style to the Victorian style with the image recognition algorithm. Moreover, the architecture module 718 can determine the architectural landmark 414 based on selecting the geographic location 204 having the architecture feature 212 unavailable to other instances of the geographic location 204. The architecture module 718 can send the architectural landmark 414 to the landmark module 704.

The candidate module 706 can include a category module 720. The category module 720 determines the categorized landmark 416. For example, the category module 720 can determine the categorized landmark 416 based on the category of interest 244 of FIG. 2, the travel history 220, or a combination thereof.

More specifically, the category module 720 can determine the categorized landmark 416 based on the travel history 220 meeting or exceeding the travel threshold 422 for the category of interest 244. The category of interest 244 of the geographic location 204 can represent amusement park. The travel threshold 422 can represent visitation of at least 10 times within the travel time 218 of 1 year. The travel history 220 can indicate that the user of the candidate module 706 visited the amusement park 12 times within 1 year. The category module 720 can determine the categorized landmark 416 based on selecting the geographic location 204 with the travel history 220 meeting exceeding the travel threshold 422 for the category of interest 244

It has been discovered that the navigation system 100 determining the categorized landmark 416 can improve the safety of user operating the vehicle, the navigation system 100, or a combination thereof. By determining the categorized landmark 416 as the candidate landmark 406 for the guidance landmark 314, the navigation system 100 can improve the user's comfort level for traversing the travel route 240 by providing a recognizable navigation reference for the user to rely on. As a result, the increased comfort level allows the user to focus for safer operation of the vehicle, the navigation system 100, or a combination thereof.

The candidate module 706 can include a profile module 722. The profile module 722 determines the personal landmark 418. For example, the profile module 722 can determine the personal landmark 418 based on the user profile 442.

The profile module 722 can determine the personal landmark 418 in a number of ways. For example, the profile module 722 can determine the personal landmark 418 based on the user profile 442 having the user's home address, work address, or a combination thereof. The profile module 722 can determine the personal landmark 418 to represent the home address, the work address, or a combination thereof.

For another example, the user profile 442 can include the user's interest 444 of FIG. 4. The user's interest 444 can represent user's favorite sports team, user's favorite activity, or a combination thereof. More specifically, the user's favorite sports team can represent the San Francisco Giants, an American baseball team. The profile module 722 can determine the personal landmark 418 based on the user's interest 444 by selecting the geographic location 204 representing the Giant's home stadium as the personal landmark 418.

For further example, user's favorite activity can represent "reading," "hiking," or a combination thereof. The profile module 722 can determine the personal landmark 418 based on the user's interest 444 by selecting the geographic location 204 catering to user's favorite activity, such as a bookstore, outdoor gear shop, or a combination thereof.

For another example, the user profile 442 can include the vehicle type 446 of FIG. 4. More specifically, the profile module 722 can determine the personal landmark 418 based on the vehicle type 446. More specifically, the vehicle type 446 can represent Bentley™, an English high-end car. The profile module 722 can determine geographic location 204 representing Prada™, a high-end fashion store, over REI™, an outdoor gear store, as the personal landmark 418 based on the vehicle type 446 that the user operates. The profile module 722 can send the personal landmark 418 to the landmark module 704.

It has been discovered that the navigation system 100 determining the personal landmark 418 can improve the safety of user operating the vehicle, the navigation system 100, or a combination thereof. By determining the personal landmark 418 as the candidate landmark 406 for the guidance landmark 314, the navigation system 100 can improve the user's comfort level for traversing the travel route 240 by providing a recognizable navigation reference for the user to rely on. As a result, the increased comfort level allows the user to focus for safer operation of the vehicle, the navigation system 100, or a combination thereof.

The candidate module 706 can include a dynamic module 724. The dynamic module 724 determines the dynamic reference 420. For example, the dynamic module 724 can determine the dynamic reference 420 based on the travel context 214, the visible radius 226, or a combination thereof.

The dynamic module 724 can determine the dynamic reference 420 in a number of ways. For example, the dynamic module 724 can determine the dynamic reference 420 based on the object 230 captured by the first capturing sensor 652. More specifically, the first capturing sensor 652 can capture the object 230 within the visible radius 226 and determine the object 230 as the dynamic reference 420. The first capturing sensor 652 can capture the candidacy factor 504 representing digital image of the object 230. For a specific example, the object 230 can represent a black car. The travel context 214 can indicate that the black car ahead of the user makes a right turn at the corner where the travel route 240 will guide the user to make the turn. The black car can be within the visible radius 226 of the first capturing sensor 652, thus, capturing the digital image of the black car. The dynamic module 724 can decipher the object 230 as the black car using the image recognition algorithm as discussed above. The dynamic module 724 can determine the black car as the dynamic reference 420. The dynamic module 724 can send the dynamic reference 420 to the landmark module 704.

It has been discovered that the navigation system 100 determining the dynamic reference 420 can improve the safety of user operating the vehicle, the navigation system 100, or a combination thereof. By determining the dynamic reference 420 as the candidate landmark 406 for the guidance landmark 314, the navigation system 100 can improve the user's comfort level for traversing the travel route 240 by providing a recognizable navigation reference for the user to rely on in real-time. As a result, the increased comfort level allows the user to focus for safer operation of the vehicle, the navigation system 100, or a combination thereof.

The navigation system 100 can include the landmark module 704, which can couple to the context module 702, the candidate module 706, or a combination thereof. The landmark module 704 determines the guidance landmark 314. For example, the landmark module 704 can determine the guidance landmark 314 based on the travel context 214, the popular landmark 404, the web cited landmark 406, the sizable landmark 408, the historical landmark 410, the geography landmark 412, the architectural landmark 414, the categorized landmark 416, the personal landmark 418, the dynamic reference 420, or a combination thereof.

The landmark module 704 can determine the guidance landmark 314 in a number of ways. For example, the landmark module 704 can determine the guidance landmark 314 based on selecting from a plurality of the candidate landmark 402. More specifically, the landmark module 704 can determine the guidance landmark 314 based on selecting the candidate landmark 402 according to the travel context 214, the user profile 442, or a combination thereof.

For further example, the landmark module 704 can determine the guidance landmark 314 representing the user's landmark 448 of FIG. 4, the network's landmark 450 of FIG. 4, the societal landmark 452 of FIG. 4, or a combination thereof. More specifically, the landmark module 704 can generate the user's landmark 448 based on the personal landmark 418, the travel context 214, or a combination thereof. The travel context 214 can represent the user attending a baseball game for an away game. The personal landmark 418 can represent the baseball stadium that the user is heading towards. The landmark module 704 can determine the personal landmark 418 as the user's landmark 448 for the travel context 214 of attending the baseball game in a different city.

For another example, the landmark module 704 can determine the popular landmark 404 as the user's landmark 448 based on the travel history 220 of user passing by the geographic location 204 daily. As another example, the travel context 214 can represent driving through the geographic area 202 representing a city having blocked buildings. The landmark module 704 can determine the web cited landmark 406 and the historical landmark 410, representing the same instance of the geographic location 204, as the network's landmark 450 to be shared amongst the user and user's friends as the guidance landmark 314 that is prominent for traveling through the city.

For a different example, the travel context 214 can represent nighttime. The landmark module 704 can determine the architectural landmark 414 having the architecture feature 212 for the brand of McDonald's™ as the societal landmark 452 for selecting the guidance landmark 314 that is easily recognizable to general population within the geographic area 202.

For further example, the landmark module 704 can rank the candidate landmark 402 based on the travel context 214, the user profile 442, or a combination thereof for selecting the candidate landmark 402 as the guidance landmark 314. More specifically, the travel context 214 can represent user's home town. The landmark module 704 can rank the candidate landmark 402 representing the popular landmark 404 over the sizable landmark 408 because of the user's familiarity of the geographic area 202 for selecting as the guidance landmark 314.

In contrast, the landmark module 704 can rank the historical landmark 410, the sizable landmark 408, or a combination thereof over the popular landmark 404 based on the travel context 214 of out of town. The popular landmark 404 can be a weak factor to be considered since the travel history 220 indicates the users has never traveled in the geographic region. As a result, the landmark module 704 can select the historical landmark 410, the sizable landmark 408, or a combination thereof as the guidance landmark 314 for selecting the candidate landmark 402 that is more easily recognizable. The landmark module 704 can send the guidance landmark 314 to a navigation module 726.

The navigation system 100 can include the navigation module 726, which can couple the landmark module 704. The navigation module 726 generates the navigation guidance 302 of FIG. 3. For example, the navigation module 726 can generate the navigation guidance 302 representing the landmark based guidance 308 of FIG. 3, the pre-emptive guidance 310 of FIG. 3, the audio guidance 304 of FIG. 3, the conversational guidance 316 of FIG. 3, or a combination thereof based on the guidance landmark 314.

The navigation module 726 can generate the navigation guidance 302 in a number of ways. The navigation module 726 can include a route module 728. The route module 728 generates the travel route 240. For example, the route module 728 can generate the travel route 240 from the current location 206 to the target destination 208.

The route module 728 can generate the travel route 240 in a number of ways. For example, the route module 728 can generate the travel route 240 having the guidance landmark 314 to guide the user from the current location 206 to the target destination 208. More specifically, the route module 728 can generate the travel route 240 having a plurality of the guidance landmark 314 to personalize the navigation guidance 302 suited for the travel context 214 to reach the target destination 208.

For example, the travel context 214 can represent daytime with good visibility. The route module 728 can generate the travel route 240 including the guidance landmark 314 representing the sizable landmark 408, such as the skyscraper, to aid the user to locate his relative location on the travel route 240, the geographic area 202, or a combination thereof.

For another example, the travel context 214 can represent nighttime with poor visibility. The route module 728 can generate the travel route 240 including the guidance landmark 314 representing the architectural landmark 414, such as the golden arches of McDonald's™, to aid the user to locate his relative location on the travel route 240, the geographic area 202, or a combination thereof.

For further example, the route module 728 can generate the travel route 240 routing to the guidance landmark 314 prior to reaching the target destination 208. As a result, the route module 728 can generate the navigation guidance 302 with the guidance landmark 314 serving as a checkpoint for improving the user's ability to reach the target destination 208. The route module 728 can send the travel route 240 to a guidance module 730.

The navigation module 726 can include a guidance module 730, which can couple to the route module 728. The guidance module 730 generates the guidance description 312 of FIG. 3. For example, the guidance module 730 can generate the landmark based guidance 308, the pre-emptive guidance 310, the conversational guidance 316, or a combination thereof having the guidance description 312 suited for the travel context 214.

The guidance module 730 can generate the landmark based guidance 308, the pre-emptive guidance 310, the conversational guidance 316, or a combination thereof in a number of ways. For example, the guidance module 730 can generate the landmark based guidance 308 having the guidance landmark 314 as part of the guidance description 312. More specifically, the travel route 240 can include the target destination 208 situated between two instances of the guidance landmark 314. The two instances can represent a train station and a movie theatre. The guidance module 730 can generate the landmark based guidance 308 having the guidance description 312 as "Your destination is between the train station and the movie theater." The "destination" used in the guidance description 312 is synonymous with the target destination 208.

For another example, the travel context 214 can represent the current location 206 of the user which passed by the guidance landmark 314 representing a golf course. The guidance module 730 can generate the landmark based guidance 308 with the guidance description 312 as "Your destination is half a mile past the golf course."

For another example, the target destination 208 representing a restaurant can be adjacent to the guidance landmark 314 representing a theatre. The guidance module 730 can generate the landmark based guidance 308 with the guidance description 312 as "This restaurant is across from the Majestic Theater."

For another example, the guidance module 730 can determine the cardinal direction of the guidance landmark 314 relative to the target destination 208 or vice versa. The guidance landmark 314 can represent Central Park. The guidance module 730 can generate the landmark based guidance 308 with the guidance description 312 as "Your destination is two blocks west of Central Park."

For another example, the guidance description 312 can base on the visible radius 226. More specifically, the guidance description 312 can include the guidance landmark 314 within the visible radius 226 to provide a reference point to the user. The guidance landmark 314 can represent a shopping mall. Moreover, the shopping mall can locate further away from the target destination 208. Since the shopping mall is within the visible radius 226 and further away from the target destination 208, the guidance module 730 can generate the landmark based guidance 308 with the guidance description 312 as "Your destination is one mile before the shopping mall."

For another example, the guidance description 312 can based on the dynamic reference 420 selected as the guidance landmark 314. The dynamic reference 420 can represent a black car making a right turn at the corner where the travel route 240 will guide the user to make a turn. The guidance module 730 can generate the landmark based guidance 308 with the guidance description 312 as "Make a right turn where the black car made the right turn."

For a different example, the guidance module 730 can generate the pre-emptive guidance 310 based on the travel condition 216 representing the past condition 232 of FIG. 2, the present condition 234 of FIG. 2, the future condition 236 of FIG. 2, the continuing condition 238 of FIG. 2, or a combination thereof. For a specific example, the past condition 232 can represent the guidance landmark 314 representing the Bay Bridge which the user had passed by two kilometers ago. The guidance module 730 can generate the pre-emptive guidance 310 having the guidance description 312 with the past condition 232 as "You have passed the Bay Bridge two kilometers ago" to provide the travel context 214 of where the current location 206 is located.

For another example, the present condition 234 can represent the guidance landmark 314 representing the categorized landmark 416, such as Starbucks Coffee™. The guidance module 730 can generate the pre-emptive guidance 310 having the guidance description 312 with the present condition 234 as "You are passing by Starbucks Coffee to your right" to provide the travel context 214 of where the current location 206 is located.

For another example, the future condition 236 can represent the guidance landmark 314 representing the geography landmark 412, such as a railroad track, that the user can encounter one kilometer ahead. The guidance module 730 can generate the pre-emptive guidance 310 having the guidance description 312 with the future condition 236 as "You will cross a railroad track in one mile" to provide the travel context 214 of what the user can expect along the travel route 240.

For another example, the continuing condition 238 can represent the guidance landmark 314 representing the geography landmark 412, such as a river, that the travel route 240 parallels. The guidance module 730 can generate the pre-emptive guidance 310 having the guidance description 312 with the continuing condition 238 as "You will be driving along a path that parallels the river to your left for the next two kilometers" to provide the travel context 214 of where the current location 206 is located.

For further example, the guidance module 730 can generate the pre-emptive guidance 310 having the guidance description 312 providing the spatial-temporal context 242 of FIG. 2. More specifically, the spatial-temporal context 242 can include the time component, such as the past condition 232, the present condition 234, the future condition 236, or a combination thereof as discussed above. Furthermore, the spatial-temporal context 242 can include the physical component such as a variety of the guidance landmark 314.

For a specific example, the guidance landmark 314 can represent the geography landmark 412 of a toll booth. The future condition 236 can represent "4 minutes from now traveling along the travel route 240." The guidance module 730 can generate the pre-emptive guidance 310 having the guidance description 312 with the spatial-temporal context 242 as "You will encounter a toll booth in 4 minutes. After the toll booth, take Interstate 86 towards Philadelphia" to provide the travel context 214 of what the user can anticipate along the travel route 240.

For a different example, the guidance module 730 can generate the conversational guidance 316 to factor the user's response 318 of FIG. 3. More specifically, the guidance module 730 can generate the conversational guidance 316 having the guidance description 312 posing a question with a reference to the guidance landmark 314. For a specific example, the guidance landmark 314 can represent an American flag. The guidance module 730 can generate the conversational guidance 316 having the guidance description 312 as "Do you see the American flag ahead?" The guidance module 730 can receive the user's response 318 as "yes" or "no."

Based on the user's response 318, the guidance module 730 can generate the conversational guidance 316 to provide the subsequent instance of the navigation guidance 302, such as the landmark based guidance 308. For example, if the user's response 318 is "yes," the guidance module 730 can generate the landmark based guidance 308 with the guidance description 312 as "Turn left at the corner with the American flag." The guidance module 730 can send the landmark based guidance 308, the pre-emptive guidance 310, the conversational guidance 316, or a combination thereof to an audio module 732. The guidance module 730 can send the navigation guidance 302 to an audio module 732, a display module 734, or a combination thereof.

It has been discovered that the navigation system 100 generating the pre-emptive guidance 310 can improve the safety of user operating the vehicle, the navigation system 100, or a combination thereof. By generating the pre-emptive guidance 310, the navigation system 100 can improve the user's comfort level for traversing the travel route 240 by providing a recognizable navigation reference for the user to rely on the past condition 232, the present condition 234, the future condition 236, the continuing condition 238, or a combination thereof. Further, the recognition of the guidance landmark 314 within the spatial-temporal context 242 can improve the efficiency of recognizing the navigation reference. As a result, the increased comfort level and improved efficiency allow the user to focus for safer operation of the vehicle, the navigation system 100, or a combination thereof.

The navigation module 726 can include the audio module 732, which can couple to the guidance module 730. The audio module 732 generates the audio guidance 304. For example, the audio module 732 can generate the audio guidance 304 based on the navigation guidance 302.

The navigation module 726 can include the display module 734, which can couple to the guidance module 730. The display module 734 displays the navigation guidance 302. For example, the display module 734 can display the navigation guidance 302 with the travel route 240 from the current location to the target destination 208 passing by the guidance landmark 314.

For illustrative purposes, the navigation system 100 is described with the candidate module 706 determining the candidate landmark 402, although it is understood that the candidate module 706 can operate differently. For example, the candidate module 706 can update the candidate landmark 402. More specifically, as the user traverses the travel route 240, the travel context 212 and the travel condition 216 can change. The candidate module 706 can update the candidate landmark 402 based on the travel context 212, the travel condition 216, or a combination thereof changed to determine the guidance landmark 314 suited for the travel context 212.

The physical transformation from traveling from one instance of the travel context 214 to another instance of the travel context 214 results in the movement in the physical world, such as people using the first device 102, the vehicle, or a combination thereof, based on the operation of the navigation system 100. As the movement in the physical world occurs, the movement itself creates additional information that is converted back into determining the candidate landmark 402, the guidance landmark 314, or a combination thereof, generating the navigation guidance 302, or a combination thereof for the continued operation of the navigation system 100 and to continue the movement in the physical world.

The first software 626 of FIG. 6 of the first device 102 of FIG. 6 can include the modules for the navigation system 100. For example, the first software 626 can include the context module 702, the source module 703, the candidate module 706, the landmark module 704, and the navigation module 726.

The first control unit 612 of FIG. 6 can execute the first software 626 for the context module 702 to determine the travel context 214. The first control unit 612 can execute the first software 626 for the source module 703 to determine the source type 502. The first control unit 612 can execute the first software 626 for the candidate module 706 to determine the candidate landmark 402. The first control unit 612 can execute the first software 626 for the landmark module 704 to determine the guidance landmark 314. The first control unit 612 can execute the first software 626 for the navigation module 726 to generate the navigation guidance 302.

The second software 642 of FIG. 6 of the second device 106 of FIG. 6 can include the modules for the navigation system 100. For example, the second software 642 can include the context module 702, the source module 703, the candidate module 706, the landmark module 704, and the navigation module 726.

The second control unit 634 of FIG. 6 can execute the second software 642 for the context module 702 to determine the travel context 214. The second control unit 634 can execute the second software 642 for the source module 703 to determine the source type 502. The second control unit 634 can execute the second software 642 for the candidate module 706 to determine the candidate landmark 402. The second control unit 634 can execute the second software 642 for the landmark module 704 to determine the guidance landmark 314. The second control unit 634 can execute the second software 642 for the navigation module 726 to generate the navigation guidance 302.

The modules of the navigation system 100 can be partitioned between the first software 626 and the second software 642. The second software 642 can include the context module 702, the source module 703, the candidate module 706, and the landmark module 704. The second control unit 634 can execute modules partitioned on the second software 642 as previously described.

The first software 626 can include the navigation module 726. Based on the size of the first storage unit 614, the first software 626 can include additional modules of the navigation system 100. The first control unit 612 can execute the modules partitioned on the first software 626 as previously described.

The first control unit 612 can operate the first communication interface 628 of FIG. 6 to communicate the current location 206, the source type 502, the navigation guidance 302, or a combination thereof to or from the second device 106. The first control unit 612 can operate the first software 626 to operate the location unit 620 of FIG. 6. The second control unit 634 can operate the second communication interface 650 of FIG. 6 to communicate the guidance landmark 314, the source type 502, the navigation guidance 302, or a combination thereof to or from the first device 102 through the communication path 104 of FIG. 6.

The first control unit 612 can operate the first user interface 618 of FIG. 6 to present the navigation guidance 302. The second control unit 634 can operate the second user interface 638 of FIG. 6 to present the navigation guidance 302.

The navigation system 100 describes the module functions or order as an example. The modules can be partitioned differently. For example, the candidate module 706 and the landmark module 704 can be combined. Each of the modules can operate individually and independently of the other modules. Furthermore, data generated in one module can be used by another module without being directly coupled to each other. For example, the landmark module 704 can receive the travel context 214 from the context module 702. Further, one module communicating to another module can represent one module sending, receiving, or a combination thereof the data generated to or from another module.

The modules described in this application can be hardware implementation or hardware accelerators in the first control unit 612 or in the second control unit 634. The modules can also be hardware implementation or hardware accelerators within the first device 102 or the second device 106 but outside of the first control unit 612 or the second control unit 634, respectively as depicted in FIG. 6. However, it is understood that the first control unit 612, the second control unit 634, or a combination thereof can collectively refer to all hardware accelerators for the modules. Furthermore, the first control unit 612, the second control unit 634, or a combination thereof can be implemented as software, hardware, or a combination thereof.

The modules described in this application can be implemented as instructions stored on a non-transitory computer readable medium to be executed by the first control unit 612, the second control unit 634, or a combination thereof. The non-transitory computer medium can include the first storage unit 614, the second storage unit 646 of FIG. 6, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the navigation system 100 or installed as a removable portion of the navigation system 100.

It has been discovered that the navigation system 100 determining the source type 502 based on the travel context 214 improves the efficiency of determining the candidate landmark 402. By determining the source type 502 according to the travel context 214, the navigation system 100 can obtain the candidacy factor 504 from the source type 502 suited for the travel context 214. As a result, the navigation system 100 can improve the efficiency of determining the candidate landmark 402 for safer operation of the navigation system 100, the vehicle, or a combination thereof.

Figure 8:
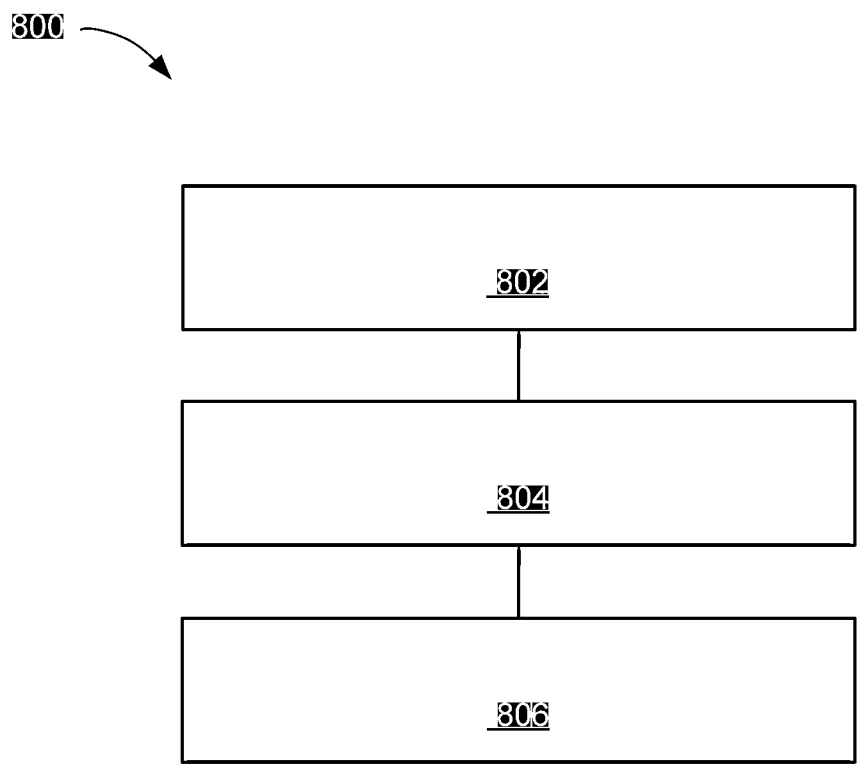
FIG. 8 is a flow chart of a method of operation of the navigation system in a further embodiment of the present invention.

Referring now to FIG. 8, therein is shown a flow chart of a method 800 of operation of the navigation system 100 in a further embodiment of the present invention. The method 800 includes: determining a travel context based on a travel condition in a block 802; determining a source type with a control unit based on the travel context for providing a candidacy factor in a block 804; and determining a candidate landmark based on the candidacy factor from the source type suited for the travel context in a block 806.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   determining a travel context based on a travel condition;
   determining a source type with a control unit based on the travel context configured to select one instance of the source type including a gathering opportunity greater than another instance of the source type configured to provide a candidacy factor;
   determining multiple instances of a capturing frequency configured to offset capturing timings of multiple instances of the source type; and
   determining a candidate landmark based on the candidacy factor from the source type with the capturing frequency suited for the travel context.

2. The method as claimed in claim 1 wherein determining the source type includes determining the source type based on the gathering opportunity for capturing an object, a geographic location, or a combination thereof.

3. The method as claimed in claim 1 wherein determining the source type includes determining the source type based on a user profile for setting a preferred source for providing the candidacy factor.

4. The method as claimed in claim 1 wherein determining the source type includes determining the source type based on a travel mode for selecting the source type suited for the travel context.

5. The method as claimed in claim 1 wherein determining the source type includes determining the source type based on a geographic area for selecting the source type suited for the travel context.

6. The method as claimed in claim 1 wherein determining the source type includes determining a sensor type based on the travel context for selecting a first capturing sensor, a second capturing sensor, or a combination thereof.

7. The method as claimed in claim 1 wherein determining the source type includes determining a sensor type based on the geographic area for selecting a first capturing sensor, a second capturing sensor, or a combination thereof suited for the travel context.

8. The method as claimed in claim 1 wherein determining the source type includes determining a sensor type based on the gathering opportunity for capturing an object, a geographic location, or a combination thereof.

9. The method as claimed in claim 1 further comprising determining the capturing frequency for the travel context for adjusting a first capturing sensor, a second capturing sensor, or a combination thereof.

10. The method as claimed in claim 1 further comprising changing the capturing frequency based on a travel history for adjusting a first capturing sensor, a second capturing sensor, or a combination thereof for the travel context.

11. A navigation system comprising:
a control unit configured to:
determine a travel context based on a travel condition,
determine a source type based on the travel context for selecting one instance of the source type including a gathering opportunity greater than another instance of the source type for providing a candidacy factor,
determine multiple instances of a capturing frequency for offsetting capturing timings of multiple instances of the source type;
determine a candidate landmark based on the candidacy factor from the source type with the capturing frequency suited for the travel context,
generate a navigation guidance based on the candidate landmark, and
a communication interface, coupled to the control unit, configured to communicate the navigation guidance for presenting on a device.

12. The system as claimed in claim 11 wherein the control unit is configured to determine the source type based on the gathering opportunity for capturing an object, a geographic location, or a combination thereof.

13. The system as claimed in claim 11 wherein the control unit is configured to determine the source type based on a user profile for setting a preferred source for providing the candidacy factor.

14. The system as claimed in claim 11 wherein the control unit is for generating a pre-emptive guidance based on a future condition for providing the travel context of traversing a travel route.

15. The system as claimed in claim 11 wherein the control unit is configured to determine the source type based on a travel mode for selecting the source type suited for the travel context.

16. A non-transitory computer readable medium comprising:
determining a travel context based on a travel condition;
determining a source type based on the travel context for selecting one instance of the source type including a gathering opportunity greater than another instance of the source type configured to provide a candidacy factor;
determining multiple instances of a capturing frequency configured to offset capturing timings of multiple instances of the source type; and
determining a candidate landmark based on the candidacy factor from the source type with the capturing frequency suited for the travel context.

17. The non-transitory computer readable medium as claimed in claim 16 wherein determining the source type based on the gathering opportunity for capturing an object, a geographic location, or a combination thereof.

18. The non-transitory computer readable medium as claimed in claim 16 wherein determining the source type based on a user profile for setting a preferred source for providing the candidacy factor.

19. The non-transitory computer readable medium as claimed in claim 16 wherein determining the source type based on a travel mode for selecting the source type suited for the travel context.

20. The non-transitory computer readable medium as claimed in claim 16 wherein determining the source type based on a geographic area for selecting the source type suited for the travel context.

* * * * *